(12) United States Patent
Arimilli et al.

(10) Patent No.: US 9,998,883 B2
(45) Date of Patent: Jun. 12, 2018

(54) GLASS PANE FOR COLLABORATIVE ELECTRONIC COMMUNICATION

(71) Applicants: Nathan Dhilan Arimilli, Austin, TX (US); Nevin Kumar Arimilli, Austin, TX (US); Shivani Kumar Arimilli, Austin, TX (US)

(72) Inventors: Nathan Dhilan Arimilli, Austin, TX (US); Nevin Kumar Arimilli, Austin, TX (US); Shivani Kumar Arimilli, Austin, TX (US)

( * ) Notice: Subject to any disclaimer, the term of this patent is extended or adjusted under 35 U.S.C. 154(b) by 149 days.

(21) Appl. No.: 14/871,502

(22) Filed: Sep. 30, 2015

(65) Prior Publication Data

US 2017/0094482 A1 Mar. 30, 2017

(51) Int. Cl.
*H04W 4/12* (2009.01)
*H04L 12/58* (2006.01)
(Continued)

(52) U.S. Cl.
CPC ............ *H04W 4/12* (2013.01); *G06F 3/0481* (2013.01); *G06F 3/0484* (2013.01); *G06Q 10/10* (2013.01);
(Continued)

(58) Field of Classification Search
CPC . H04L 12/1813; H04L 12/1822; H04L 51/04; H04L 51/046; H04L 51/16; H04L 51/32; H04L 65/4015; H04L 65/403; H04L 67/025; H04L 67/12; H04L 67/141; H04L 67/26; H04L 67/47; H04L 67/125; H04L 67/38; H04L 67/42; H04M 1/72527;
(Continued)

(56) References Cited

U.S. PATENT DOCUMENTS 7,222,156 B2 * 5/2007 Gupta .................. G06F 17/241
709/206
7,472,351 B1 * 12/2008 Zilka ................... G06Q 10/107
709/206
(Continued)

FOREIGN PATENT DOCUMENTS

CN          104333574 A  *  2/2015

*Primary Examiner* — Eric Nowlin
(74) *Attorney, Agent, or Firm* — Russell Ng PLLC; Brian F. Russell

(57) ABSTRACT

An electronic communication device detects initiation of a real-time communication link between the electronic communication device and a communication endpoint via a communication network. In response to the detecting, the electronic communication device automatically presents, within a display associated with the electronic communication device during a duration of the real-time communication link, a communication portal including at least a Glass pane containing a collaborative collection of data elements shared between and updatable by both a user of electronic communication device and a party associated with the communication endpoint. During a duration of the real-time communication link, the electronic communication device synchronizes data elements presented within the Glass pane between electronic communication device and the communication endpoint such that an update to the data collection is presented both within the Glass pane of the display and at the communication endpoint.

18 Claims, 15 Drawing Sheets

(51) Int. Cl.
　　　*H04M 1/725*　　　(2006.01)
　　　*G06F 3/0481*　　　(2013.01)
　　　*G06F 3/0484*　　　(2013.01)
　　　*G06Q 10/10*　　　(2012.01)
(52) U.S. Cl.
　　　CPC ........ *H04L 51/16* (2013.01); *H04M 1/72522* (2013.01); *G06F 2203/04803* (2013.01)
(58) Field of Classification Search
　　　CPC ........ H04M 1/72583; H04M 1/72522; H04W 4/12; G06F 3/0481; G06F 3/0484; G06F 3/1407; G06F 3/1415; G06F 3/1423; G06F 3/1454; G06F 9/4445; G06F 2203/04803; G06Q 10/101; H04N 7/15; H04N 7/157
　　　See application file for complete search history.

(56) References Cited

U.S. PATENT DOCUMENTS

| | | | | |
|---|---|---|---|---|
| 7,516,410 B2* | 4/2009 | Thompson | G06F 3/0481 | 715/753 |
| 7,617,457 B2* | 11/2009 | Kortum | G06Q 10/10 | 370/260 |
| 7,640,506 B2* | 12/2009 | Pratley | G06Q 10/10 | 715/751 |
| 7,647,373 B2* | 1/2010 | Johnson | G06F 17/241 | 709/203 |
| 7,650,380 B2* | 1/2010 | Andreev | H04L 12/1822 | 709/204 |
| 7,818,350 B2* | 10/2010 | New | G06F 17/30766 | 707/803 |
| 7,848,984 B1* | 12/2010 | Robb | G06F 9/54 | 705/35 |
| 8,091,033 B2* | 1/2012 | von Sichart | G06Q 10/109 | 715/751 |
| 8,271,887 B2* | 9/2012 | Offer | H04L 65/1069 | 709/204 |
| 8,386,925 B2* | 2/2013 | Nagasaka | G06F 17/30017 | 715/200 |
| 8,423,613 B2* | 4/2013 | Andreev | H04L 12/1822 | 709/204 |
| 8,625,769 B1* | 1/2014 | Allen | 348/14.08 | |
| 8,924,862 B1* | 12/2014 | Luo | G06F 9/543 | 715/751 |
| 9,398,059 B2* | 7/2016 | Shepherd | H04L 65/403 | |
| 9,420,014 B2* | 8/2016 | Pegg | H04L 65/4015 | |
| 9,584,464 B2* | 2/2017 | Nordstrom | H04L 51/32 | |
| 9,715,476 B2* | 7/2017 | Megiddo | G06F 15/163 | |
| 9,798,944 B2* | 10/2017 | Duong | G06K 9/2081 | |
| 2002/0016788 A1* | 2/2002 | Burridge | G06F 17/30873 | |
| 2002/0075304 A1* | 6/2002 | Thompson | G06F 3/0481 | 715/751 |
| 2002/0075306 A1* | 6/2002 | Thompson | G06F 3/0481 | 715/753 |
| 2002/0085030 A1* | 7/2002 | Ghani | G06Q 10/10 | 715/751 |
| 2003/0023679 A1* | 1/2003 | Johnson | G06F 17/241 | 709/204 |
| 2003/0041108 A1* | 2/2003 | Henrick | G06F 17/30873 | 709/205 |
| 2004/0208303 A1* | 10/2004 | Rajagopalan | H04M 3/54 | 379/202.01 |
| 2005/0149876 A1* | 7/2005 | Kortum | G06Q 10/10 | 715/753 |
| 2005/0182817 A1* | 8/2005 | Andreev | H04L 12/1822 | 709/204 |
| 2005/0188016 A1* | 8/2005 | Vdaygiri | G06Q 10/10 | 709/205 |
| 2005/0289471 A1* | 12/2005 | Thompson | G06F 3/0481 | 715/751 |
| 2006/0026502 A1* | 2/2006 | Dutta | G06Q 10/10 | 715/230 |
| 2006/0070003 A1* | 3/2006 | Thompson | G06F 3/0481 | 715/758 |
| 2006/0155785 A1* | 7/2006 | Berry | G06Q 10/10 | |
| 2006/0161623 A1* | 7/2006 | Montgomery | G09B 5/06 | 709/204 |
| 2006/0167996 A1* | 7/2006 | Orsolini | G06Q 10/10 | 709/204 |
| 2006/0195521 A1* | 8/2006 | New | G06F 17/30766 | 709/204 |
| 2006/0236247 A1* | 10/2006 | Morita | G06F 19/321 | 715/733 |
| 2007/0208992 A1* | 9/2007 | Koren | G06Q 10/10 | 715/212 |
| 2008/0139301 A1* | 6/2008 | Holthe | A63F 13/00 | 463/25 |
| 2009/0019367 A1* | 1/2009 | Cavagnari | G06F 21/62 | 715/716 |
| 2009/0099919 A1* | 4/2009 | Schultheiss | G06Q 10/00 | 705/14.1 |
| 2009/0106261 A1* | 4/2009 | Nagasaka | G06F 17/30017 | |
| 2009/0119371 A1* | 5/2009 | Chang | H04L 12/1827 | 709/206 |
| 2009/0157811 A1* | 6/2009 | Bailor | G06F 17/30168 | 709/204 |
| 2009/0192845 A1* | 7/2009 | Gudipaty | G06Q 10/10 | 705/7.19 |
| 2009/0271696 A1* | 10/2009 | Bailor | G06Q 10/10 | 715/229 |
| 2010/0070881 A1* | 3/2010 | Hanson | G06Q 10/06 | 715/753 |
| 2010/0122185 A1* | 5/2010 | Andreev | H04L 12/1822 | 715/758 |
| 2010/0131327 A1* | 5/2010 | Hseush | G06Q 10/00 | 705/319 |
| 2010/0223345 A1* | 9/2010 | Gupta | G06Q 10/109 | 709/206 |
| 2010/0257457 A1* | 10/2010 | De Goes | G06Q 10/10 | 715/751 |
| 2010/0302150 A1* | 12/2010 | Shelton | G06F 17/30165 | 345/158 |
| 2011/0106557 A1* | 5/2011 | Gazula | G06Q 10/10 | 705/3 |
| 2012/0030289 A1* | 2/2012 | Buford | G06Q 10/10 | 709/205 |
| 2012/0082226 A1* | 4/2012 | Weber | H04N 7/141 | 375/240.12 |
| 2012/0106541 A1* | 5/2012 | Su | G06F 3/1454 | 370/352 |
| 2012/0192086 A1* | 7/2012 | Ghods | G06Q 10/10 | 715/753 |
| 2012/0284626 A1* | 11/2012 | Joshi | G06Q 10/10 | 715/730 |
| 2012/0297313 A1* | 11/2012 | Sharma | G06Q 10/10 | 715/751 |
| 2012/0317501 A1* | 12/2012 | Milou | G06Q 10/101 | 715/753 |
| 2013/0110937 A1* | 5/2013 | Burns | G06Q 10/103 | 709/205 |
| 2013/0205230 A1* | 8/2013 | Andreev | H04L 12/1822 | 715/758 |
| 2013/0263021 A1* | 10/2013 | Dunn | H04L 12/1827 | 715/756 |
| 2013/0339099 A1* | 12/2013 | Aidroos | G06Q 50/01 | 705/7.36 |
| 2014/0074909 A1* | 3/2014 | Gunderson | H04L 12/1822 | 709/203 |
| 2014/0143234 A1* | 5/2014 | Scherpa | G06F 17/30554 | 707/722 |
| 2014/0223334 A1* | 8/2014 | Jensen | G06Q 10/101 | 715/753 |
| 2014/0310613 A1* | 10/2014 | Megiddo | H04L 65/403 | 715/753 |
| 2015/0106748 A1* | 4/2015 | Monte | G06F 3/0482 | 715/753 |
| 2015/0128069 A1* | 5/2015 | Ouyang | H04L 65/403 | 715/753 |

(56) References Cited

U.S. PATENT DOCUMENTS

| | | | |
|---|---|---|---|
| 2015/0142884 A1* | 5/2015 | Veramendi | G06F 17/3028 709/204 |
| 2015/0149929 A1* | 5/2015 | Shepherd | H04L 65/403 715/753 |
| 2015/0163321 A1* | 6/2015 | Abou Mahmoud | G06F 17/3053 715/745 |
| 2015/0277725 A1* | 10/2015 | Masterson | G06F 3/04847 715/753 |
| 2015/0281150 A1* | 10/2015 | Masterson | G06F 3/04847 715/752 |
| 2015/0288756 A1* | 10/2015 | Larabie-Belanger | H04L 67/1095 715/753 |
| 2015/0304369 A1* | 10/2015 | Sandholm | G06Q 10/10 715/753 |
| 2015/0326642 A1* | 11/2015 | Cao | G06F 9/4445 709/204 |
| 2015/0378995 A1* | 12/2015 | Brown | H04L 12/1827 707/608 |
| 2016/0132608 A1* | 5/2016 | Rathod | G06F 17/30867 707/722 |
| 2016/0148157 A1* | 5/2016 | Walia | G06Q 10/101 705/300 |
| 2016/0164823 A1* | 6/2016 | Nordstrom | H04L 51/32 709/206 |
| 2016/0283456 A1* | 9/2016 | Sitrick | G06F 3/04845 |
| 2016/0285921 A1* | 9/2016 | Savostiyanov | H04L 65/4038 |
| 2017/0041390 A1* | 2/2017 | Ben-Shaul | G06F 9/4451 |
| 2017/0054661 A1* | 2/2017 | Golcher Barguil | H04L 51/046 |
| 2017/0063749 A1* | 3/2017 | Gupta | G06Q 10/109 |
| 2017/0076348 A1* | 3/2017 | Jennings | G06Q 30/0621 |
| 2017/0235739 A1* | 8/2017 | Yang | G06F 17/30064 715/784 |

\* cited by examiner

GLASS PANE FOR COLLABORATIVE ELECTRONIC COMMUNICATION

BACKGROUND OF THE INVENTION

The present invention relates to electronic communication, and more specifically, to collaborative electronic communication.

With the pervasive use of electronic devices, such as smartphones, laptop computers, tablet computers and smart watches, people now commonly communicate via any of a number of alternative electronic communication modalities, including voice and video calls, emailing, texting, instant messaging, and social media messaging. The variety of modalities of communication can enhance communication in that a person can select a preferred electronic communication modality based on factors such as the parameters of their current environment (e.g., ambient noise level and privacy), the length and content of the communication, etc.

As described herein, electronic communication can be enhanced through a new collaborative electronic communication modality that can be employed in place of or in conjunction with these existing electronic communication modalities.

BRIEF SUMMARY

In some embodiments, an electronic communication device detects initiation of a real-time communication link between the electronic communication device and a communication endpoint via a communication network. In response to the detecting, the electronic communication device automatically presents, within a display associated with the electronic communication device during a duration of the real-time communication link, a communication portal including at least a Glass pane containing a collaborative collection of data elements shared between and updatable by both a user of electronic communication device and a party associated with the communication endpoint. During a duration of the real-time communication link, the electronic communication device synchronizes data elements presented within the Glass pane between electronic communication device and the communication endpoint such that an update to the data collection is presented both within the Glass pane of the display and at the communication endpoint.

DETAILED DESCRIPTION

Figure 1:
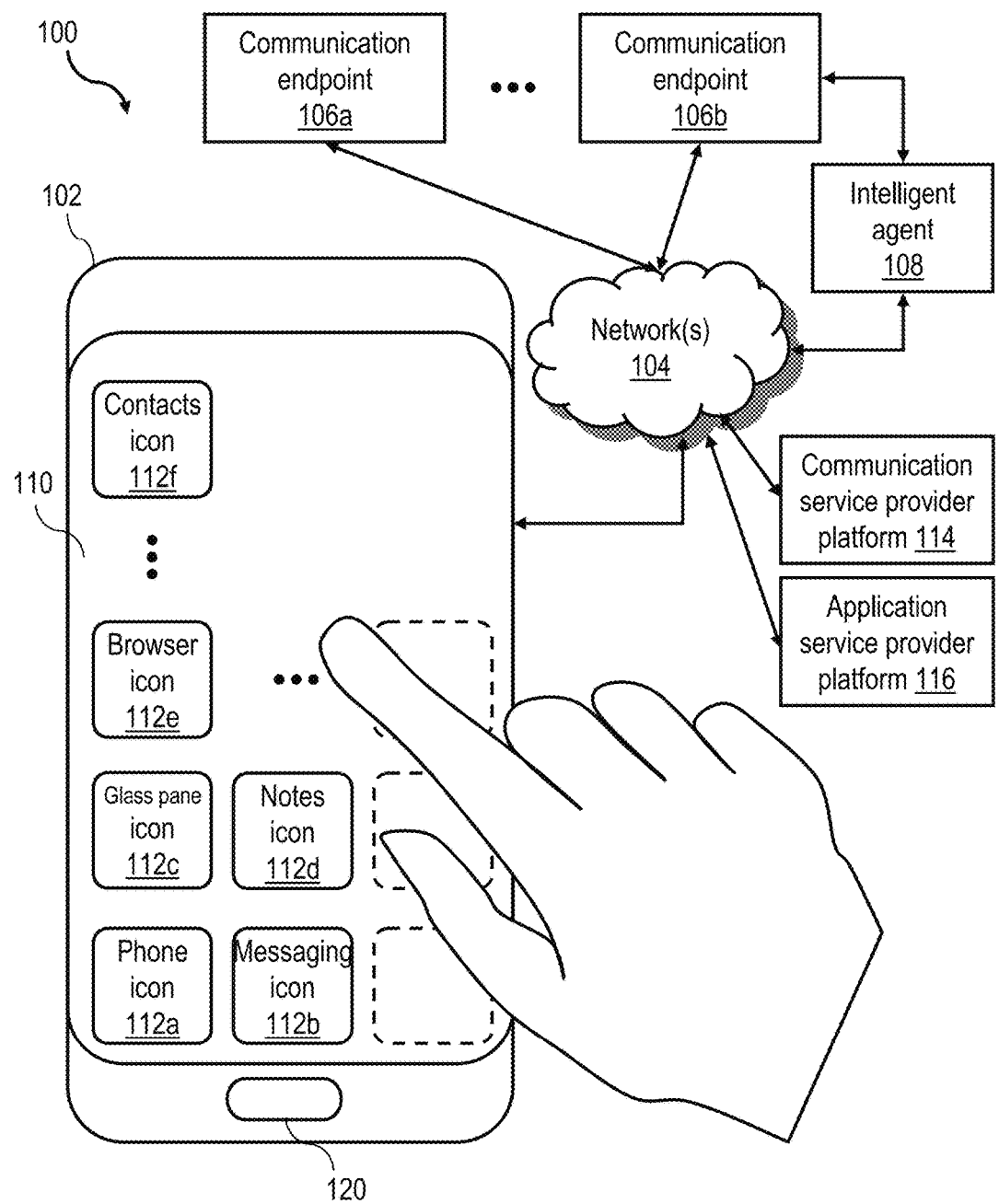
FIG. 1 is a high level block diagram of an electronic communication environment in accordance with one embodiment.

With reference now to the figures, and in particular with reference to FIG. 1, there is illustrated an electronic communication environment 100 in which the inventions disclosed herein may advantageously be utilized. Electronic communication environment 100 includes an electronic communication device 102, which as described in greater detail below may be utilized to communicate electronically with one or more additional electronic devices, such as communication endpoints 106a, 106b and/or intelligent agent 108, via one or more communication networks 104. In various realizations of electronic communication environment 100, communication network(s) 104 may include, for example, a wireless wide-area network (WAN) including a plurality of distributed terrestrial, atmospheric and/or satellite-based antennae supporting long range two-way radio frequency communication. Communication network(s) 104 may alternatively or additionally include one or more circuit-switched and/or packet-switched communication networks, including, for example, the Internet.

Communication between electronic communication device 102 and other electronic devices may be handled directly by the devices themselves or may be facilitated by a third party platform, such as a communication service provider platform 114 or application service provider platform 116. Communication service provider platform 114 is a data processing system associated with and/or operated by a network infrastructure or network service company that provides one or more electronic communication services (e.g., Internet, telephony, text messaging, etc.) to one or more of electronic communication device 102 and communication endpoints 106. Application service provider platform 116 is a data processing system associated with and/or operated by a source or provider of one or more of electronic communication applications that can executed to provide electronic communication between communication endpoints 102, 106, as discussed further below. These network-connected third party platforms 114, 116 may serve as intermediaries that relay electronic communication between communication endpoints 102, 106, and may alternatively or additionally provide temporary and/or long term storage of the content of electronic communication and/or synchronization services between communication endpoints 102, 106.

Figure 2:
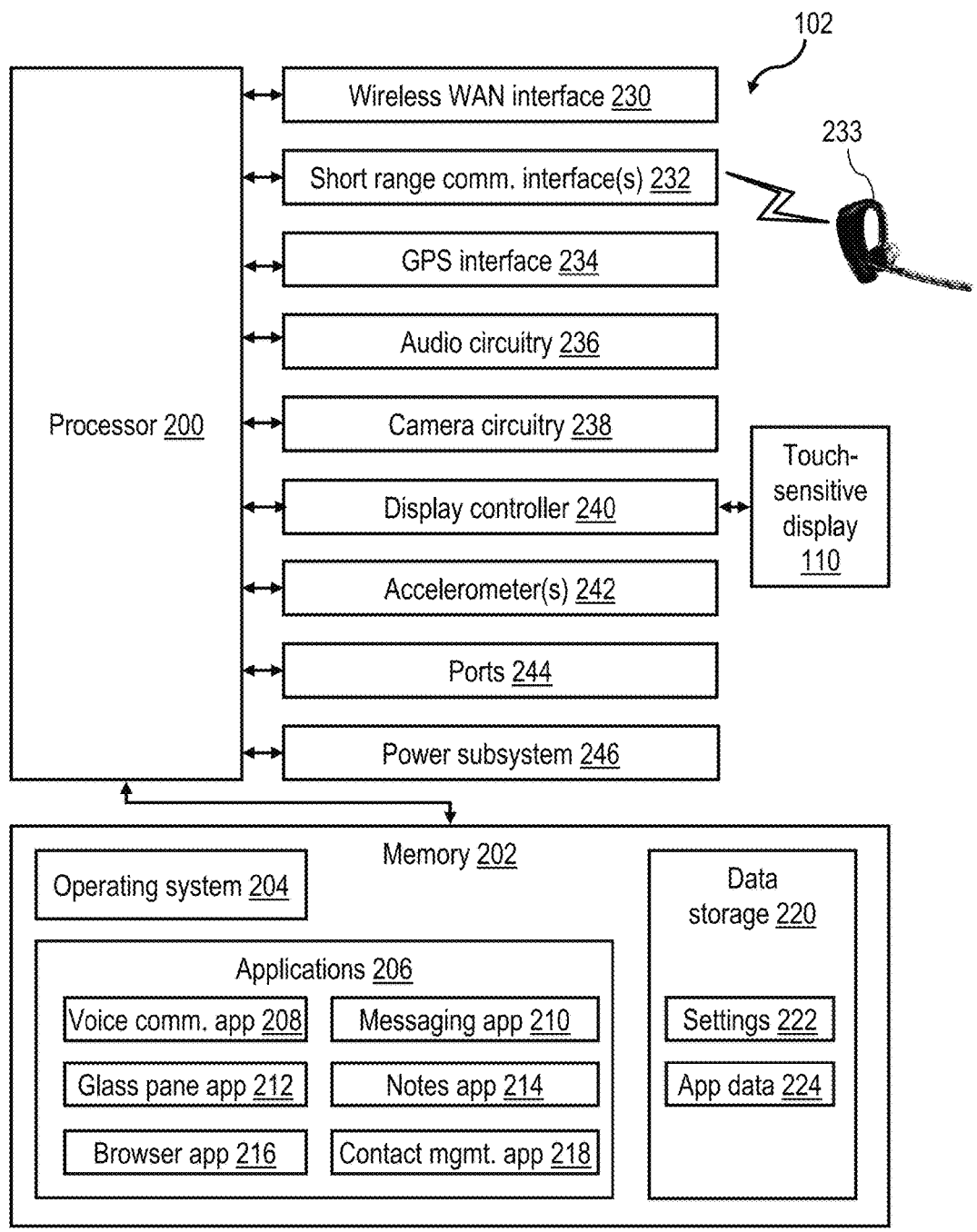
FIG. 2 is a block diagram of an electronic communication device in accordance with one embodiment.

In the illustrated embodiment, electronic communication device 102 may comprise, for example, a data processing system, such as a smartphone, smart watch, computer system (e.g., desktop, laptop or tablet), display device (e.g., television set), video game console, etc. In each of these embodiments, electronic communication device 102 includes and/or is coupled to a display device, which may be (but is not required to be) a touch-sensitive display device 110. Electronic communication device may optionally include one or more manually manipulable input buttons 120. Although not required, in the depicted example, electronic communication device 102 presents within display device 110 a graphical user interface including one or more icons 112a-112f, each of which may be selected by a user to invoke execution of a corresponding application by electronic communication device 102. (Exemplary applications are illustrated in FIG. 2.) In the illustrated example, phone icon 112a corresponds to a voice communication application 208 (which may include video call capability, for example, as supported by Apple® FaceTime™), messaging icon 112b corresponds to a messaging (e.g., texting) application 210, Glass pane icon 112c corresponds to a Glass pane application 212, notes icon 112d corresponds to a notes (e.g., text editing) application 214, browser icon 112e corresponds to a browser application 216, and contacts icon 112f corresponds to a contact management application 218. As is known in the art, electronic communication device 102 may execute multiple of these applications concurrently. Further, in some implementations, the functionality of multiple of these applications (e.g., voice communication application 208 and/or messaging application 210, and/or Glass pane application 212, and/or notes application 214) can be combined into a single application or implemented within a common application framework.

In some embodiments of electronic communication environment 100, one or more of communication endpoints 106a, 106b may be implemented similarly to electronic communication device 102. One or more of communication endpoints 106a, 106b may alternatively or additionally be implemented as an intelligent device (e.g., an appliance, vehicle, or controller) having an embedded processor. Networks environments including such devices are sometimes referred to as the Internet of Things (IOTs). In some cases, one or more of communication endpoints 106a, 106b may alternatively or additionally be implemented with limited local data storage, processing power, and/or communication capabilities relative to electronic communication device 102 and/or other communication endpoints 106. In such cases, a communication endpoint, such as communication endpoint 106b, may rely on private or network communication with a remote intelligent agent 108 (e.g., a mainframe, server, or other computing platform implementing a learning system) to provide data storage, processing, and/or communication capabilities lacked by communication endpoint 106b.

Referring now to FIG. 2, there is depicted a high-level block diagram of an exemplary implementation of electronic communication device 102 in accordance with exemplary embodiments in which electronic communication device 102 is implemented, for example, as a smartphone, desktop computer, laptop computer, tablet computer, or automotive computer. As illustrated, electronic communication device 102 includes a processor 200, which may include one or more processor cores for executing program code (e.g., software and/or firmware). As shown, processor 200 is coupled, either directly or indirectly, to a variety of different components within electronic communication device 102. For example, processor 200 is coupled to a memory 202 (e.g., dynamic random access memory (DRAM), static random access memory (SRAM), flash memory, and/or magnetic or optical disk drive, etc.) which provides storage for data and program code (e.g., software and/or firmware) executed by processor 200. The program code stored within memory 202 includes an operating system 204, as well as applications ("apps") 206. Applications 206 include voice communication application 208, messaging (texting) application 210, Glass pane application 212, notes (text editing) application 214, browser application 216, and contact management application 218. In some embodiments, voice communication application 208, messaging (texting) application 210, notes application 214, browser application 216, and contact management application 218 can be (but need not be) conventional. Glass pane application 212, which supports new electronic communication modalities, is described in detail below.

The data storage 220 of memory 202 may include input data and output data of the processing performed by processor 200. Data accessed and/or processed by applications 206 is referred to herein as application data 224. Data storage 220 may also store settings 222 that control and/or customize the operation of electronic communication device 102 and/or the program code it executes.

Electronic communication device 102 may include a number of additional components providing, supporting and/or expanding its processing, storage, and/or communication capabilities. For example, electronic communication device 102 includes a wireless WAN interface (e.g., a transceiver and antenna) 230 supporting two-way wireless radio frequency communication with communication network(s) 104. In order to support communication with other electronics within close range, electronic communication device 102 may be further equipped with one or more short range communication interface(s) 232, which may implement protocols for 802.11x, Bluetooth, 900 MHz communication or the like. As one exemplary use, short range communication interfaces may be utilized to interface input/output device(s), such as a Bluetooth headset 233, to electronic communication device 102. Electronic communication device 102 may further include a global positioning satellite (GPS) interface (e.g., GPS receiver and GPS antenna) that receives GPS signals from GPS satellites and processes the GPS signals to provide location information to processor 200.

Electronic communication device 102 may also include audio circuitry 236 (e.g., at least an audio interface optionally further coupled to microphone(s) and speaker(s)), camera circuitry 238 and a display controller 240 through which electronic communication device 112 may present and receive audio and/or image data. One or more ports 244 may also optionally be utilized to expand the processing, communication and/or data storage capabilities of electronic communication device 102. Finally, electronic communication device 102 includes a power subsystem 246 that powers processor 200 and the other components of electronic communication device 102. Power subsystem 246 may include, for example, a battery and/or power port through which the battery may be charged from an AC power source or wireless inductive charging device.

Although FIG. 2 illustrates a number of components separately for ease of understanding, it will be appreciated by those skilled in the art that, in at least some embodiments, multiple of the illustrated components may be integrated within a common integrated circuit die or package.

Figure 3:
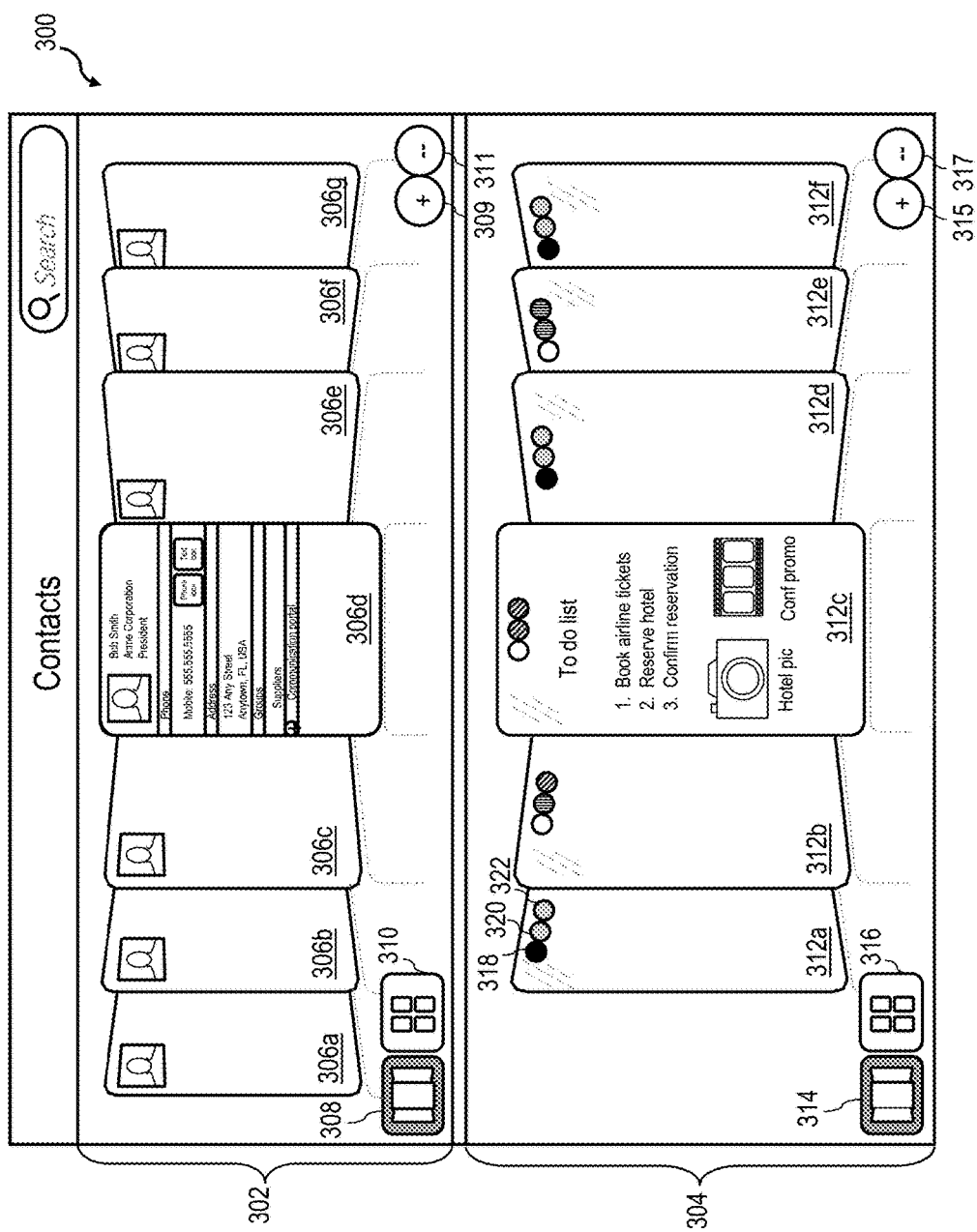
FIG. 3 illustrates an exemplary graphical user interface of a contact management application in accordance with one embodiment.

With reference now to FIG. 3, there is illustrated an exemplary graphical user interface 300 of contact management application 218 in accordance with one embodiment. Graphical user interface 300 may be presented by electronic communication device 102 within display 110, for example, in response to a user selection of contacts icon 112f.

Figure 4:
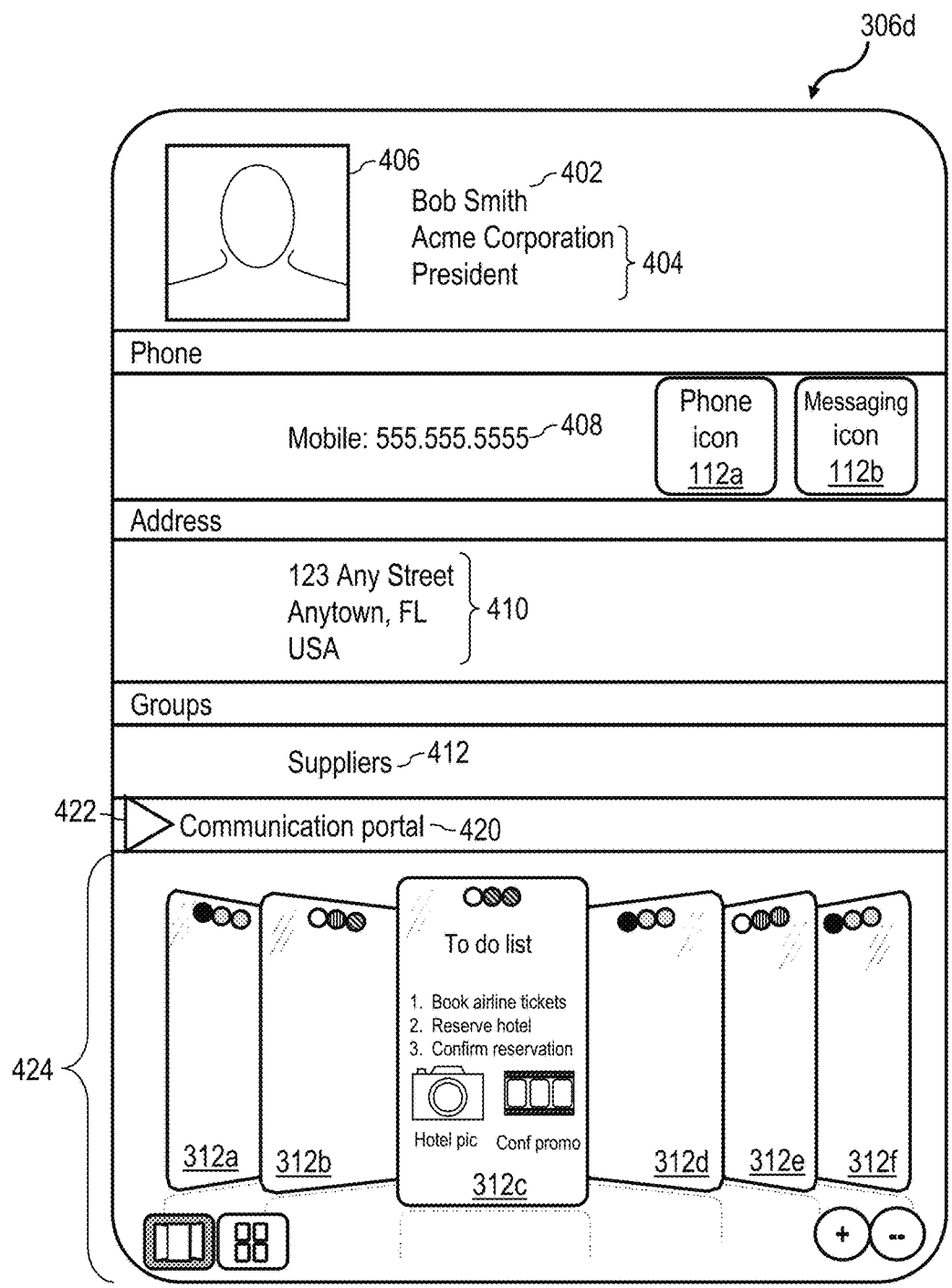
FIG. 4 depicts a more detailed view of a virtual card of a contact management application in accordance with one embodiment.

Graphical user interface 300 includes an upper register 302 and a lower register 304. In upper register 302, contact management application 218 presents virtual cards 306 (e.g., virtual cards 306a-306g) each corresponding to one of multiple contacts in a contact list maintained by contact management application 218 for the user of electronic communication device 102. Utilizing display controls 308 and 310, the user may select whether virtual cards 306 are presented in a rotating card deck (as shown) or in a grid, respectively. When virtual cards 306 are presented in a rotating card deck on a display 110 having a touch screen, the user can use horizontal swiping gestures to rotate the card deck to the left or to the right to cause a desired virtual card to be presented in the central focus position, which in FIG. 3 contains virtual card 306d. Although only virtual card 306d is illustrated in detail in FIG. 3, it should be understood that each of virtual cards 306a-306g can contain similar contact information, such as a thumbnail picture, a contact name, title, contact numbers, email addresses, social media handles, etc., to enable a user to easily browse among virtual cards 306 for the particular virtual card 306 corresponding to a contact of interest. Although not required, in one embodiment, virtual cards 306 are presented in the alphabetical order of the contacts' first or last names or in some other user-selected ordering. In response to a further user selection of a virtual card 306 presented in the central focus position (e.g., by a "tap" or "press and hold" selection of the virtual card 306 via a touch screen interface), contact management application 218 presents a more detailed view of the selected virtual card 306 in an editing mode, as shown in FIG. 4 and described below. Contact management application 218 additionally creates a new virtual card 306 or deletes an existing virtual card 306 in response to user selection of create control 316 or delete control 311, respectively.

Still referring to FIG. 3, lower register 304 provides a presentation of a collection of one or more Glass panes 312 (e.g., Glass panes 312a-312f) associated with an individual contact or group contact identified by the virtual card 306 in the central focus position. Thus, as the user browses through virtual cards 306 within upper register 302, different collections of Glass panes 312 are presented within lower register 304.

As employed herein, the term "Glass pane" refers to a structured presentation of a user-curated data collection relevant to a relationship between a user of electronic communication device 102 and a contact (which can correspond to an individual entity or group of entities). As discussed in further detail below, the data collection presented within the Glass pane can include data elements of any format, including without limitation textual content, electronic ink, images, sketches, audio clips or streams, video clips or streams, blog and social media posts, hypertext links, and/or data structures (e.g., lists, tables, spreadsheets, etc.). One specific example of a dynamic data element that may be included in the data collection presented within a Glass pane is a placeholder tag, which points to (and, if selected, accesses) a dynamic data element (e.g., a target file name, database object, or web address) defined by the placeholder tag.

Figure 5:
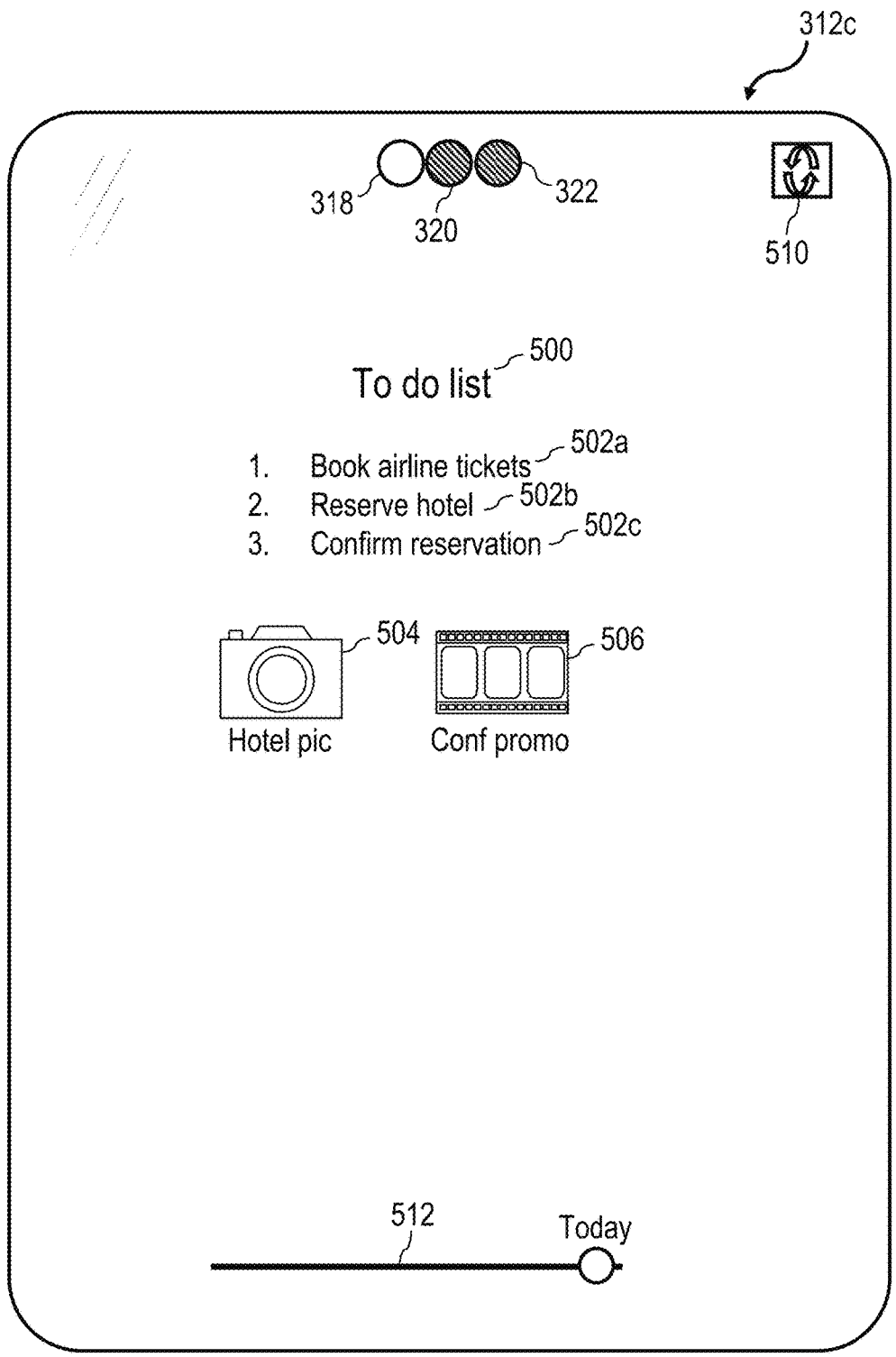
FIG. 5 illustrates a more detailed view of a Glass pane in accordance with one embodiment.

Utilizing display controls 308 and 310, the user may select whether Glass panes 312 are presented in a rotating deck (as shown) or in a grid, respectively. When Glass panes 312 are presented in a rotating deck on a display 110 having a touch screen, the user can use horizontal swiping gestures to rotate the card deck to the left or to the right to cause a desired virtual card to be presented in the central focus position, which in FIG. 3 contains Glass pane 312c. Although only Glass pane 312c is illustrated in detail in FIG. 3, it should be understood that each of Glass panes 312a-312f will generally contain a presentation of a respective data collection. In various implementations, Glass panes 312 are presented in an ordered fashion (which can be user selectable), such as alphabetically according to a title, chronologically according to date and time of creation, update or access, or according to a different user-specified ordering. In response to a further user selection of a Glass pane 312 presented in the central focus position (e.g., by a "tap" or "press and hold" selection of the Glass pane 312 via a touch screen interface), contact management application 218 invokes execution of Glass pane application 212, which presents a more detailed view of the selected Glass pane 312, as shown in FIG. 5 and described below. Glass pane application 212 is similarly invoked to create a new Glass pane 312 or to delete an existing Glass pane 312 in response to user selection of create control 315 or delete control 317, respectively.

In one preferred embodiment, a Glass pane 312 can be a "dark" pane, meaning that the data collection within the Glass pane 312 is presented only to the user who created or "owns" that Glass pane 312, or a "light" pane, meaning that the data collection is viewable and modifiable in real time by both the user of electronic communication device 102 and the contact with which the Glass pane 312 is associated. A light Glass pane 312 thus provides a collaborative space through which the user and the contact can collaboratively and electronically communicate in real time.

The user and the contact with which the Glass pane 312 is associated individually determine the number of their own dark Glass panes 312 and collaboratively determine the number of light Glass panes 312 to be associated with their relationship. Thus, by the selection of the number of Glass panes 312 allocated to a given contact relationship and the content presented within each Glass pane 312, the communication between the user and the contact can be structured and organized in an easily customizable, user-defined manner.

A user can readily visually discern different information regarding the data collections presented within Glass panes 312 via one or more visual status indicators (VSIs). In the depicted example, each Glass pane 312 has three associated VSIs, including a light/dark (LD) indicator 318, which visually indicates the visibility of the data collection within the associated Glass pane 312 (i.e., whether the Glass pane 312 is "light" or "dark"), a viewed indicator 320, which visually indicates whether all updates to the data collection within the Glass pane 312 have been viewed by the associated contact, and an update indicator 322, which visually indicates whether or not the user has viewed all updates to a light Glass pane 312 made by the associated contact. For example, in the depicted embodiment, the LD indicator 318 visually indicates whether a Glass pane 312 is a dark or light by black or white colors, respectively. In this example, viewed indicator 320 visually indicates whether or not all updates to the data collection within a light Glass pane 312 have been viewed by the associated contact by green and red colors, respectively (represented in FIG. 3 by slanted and vertical hashing, respectively). Update indicator 322 similarly visually indicates whether or not updates to the data collected by the contact have been viewed by the user of electronic communication device 102 via green and red colors, respectively. Because the data collections within dark Glass panes 312 (e.g., dark Glass panes 312a, 312d and 312f) are not visible to or modifiable by the associated contact, viewed indicator 320 and update indicator 322 can be omitted or "grayed out" on dark Glass panes 312. As should be apparent, the use of color indication is merely exemplary, and in other embodiments, any other collection of visual attributes can be utilized to implement VSIs.

Referring now to FIG. 4, there is depicted a more detailed view of virtual card 306d of FIG. 3 in accordance with one embodiment. As noted above, contact management application 218 may present a more detailed view of virtual card 306d (one filling a maximized window within display 110), for example, in response to a further selection of virtual card 306d within graphical user interface 300 of FIG. 3.

As shown, virtual card 306d includes a number of contact data fields in which a user of electronic communication device 102 can record and/or maintain contact information for an individual entity (e.g., a human or a communication endpoint 106) or a group of such entities. As shown, these contact data fields can include conventional contact data fields, such as a contact name 402, contact description 404, thumbnail image 406, phone number 408, physical address 410, and group membership 412. As should be apparent, the contact data fields may include additional unillustrated contact data fields, such as an email address field, website address field, social media address field, etc. Virtual card 406d may also include phone icon 112a and messaging icon 112b, which can be selected by a user (e.g., via the touch interface of touch-sensitive display 110) to invoke voice (or video) or text messaging communication with the contact.

Virtual card 306d additionally includes a communication portal field 420 having an associated expander control 422. User selection of expander control 422 invokes presentation by electronic communication device 102 of a composite communication portal within display 110, where the composite communication portal supports the convenient presentation of multiple modalities of electronic communication between the user and the contact, as described in greater detail with respect to FIG. 7.

In the depicted embodiment, virtual card 306d may further include a Glass pane field 424 in which the collection of Glass panes 312 associated with the contact are presented, as generally described above with reference to FIG. 3.

With reference now to FIG. 5, there is illustrated a more detailed view of an exemplary Glass pane 312c in accordance with one embodiment. As noted above, Glass pane application 212 may present this more detailed view of Glass pane 312c (one filling a maximized window within display 110), for example, in response to a further selection of Glass pane 312c within graphical user interface 300 of FIG. 3 or Glass pane field 424 of FIG. 4.

As mentioned previously, each Glass pane 312 presents a data collection curated by the user of electronic communication device 102 and/or the associated contact. The physical arrangement of representations of these data elements within the Glass pane 312 can take any of a variety of forms. In one embodiment, the Glass pane 312 presents the data elements as a layered stack of possibly overlapping tiles, where each such tile presents a representation of an individual data element. In other embodiments, the Glass pane 312 presents the data elements on a template, which may be user-selectable, for example, from local application data 224 or from a network accessible resource, such as an online application store provided by application service provider platform 116 or communication service provider platform 114. Templates, which can be defined, for example, via an extensible markup language (XML) or Cascading Style Sheets (CSS), can have pre-defined and/or customizable layouts and can further be optimized to particular types of relationships (e.g., between the user and contact) and/or projects.

In the illustrated example, the collection of data items presented within Glass pane 312c includes a title 500, multiple textual data elements 502a-502c forming a list, an image (or image placeholder) 504, and a video (or video placeholder) 506. As noted above, any other type of data element may be added to Glass pane 312c by the user of electronic communication device 102 or the contact with which Glass pane 312c is associated. For example, in some implementations in which the communication endpoint 106 with which the contents of Glass pane 312c are shared is an intelligent device, the data elements added to Glass pane 312c by the intelligent device may include, for example, commercial promotions (e.g., advertisements), scheduled or unscheduled maintenance and/or status alerts, etc. In another particular example, one predefined type of data element that can be added to the data collection within a light Glass pane 312 is a "task", which corresponds to an action or series of actions to be performed by the user or contact. In some embodiments, the task has an associated status indicator, such as a graphical status indicator (e.g., check box) or predefined textual status indicator (e.g., "in progress", "need info", "complete"), that enable the user or the contact with which the light Glass pane 312 is shared to efficiently provide status information regarding the task.

Glass panes 312 can include or have associated therewith one or more user controls that can be manipulated to optimize the presentation of the collection of data elements within Glass pane 312. These user controls can include, for example, a synchronization control 510 that, when selected, causes electronic communication device 102 to initiate synchronization of the presentation of Glass pane 312 with a communication endpoint 106 of the contact. Such synchronization may include any of pushing content of Glass pane 312 to the communication endpoint 106 of the contact, intelligent agent 108, communication service provider 114 or another network-connected third party (e.g., an application services provider); requesting synchronization service from communication service provider platform 114 or another network-connected third party platform (e.g., application service provider platform 116); providing an electronic notification to the communication endpoint 106 of the contact of an update to the Glass pane; or committing a current state of Glass pane 312 (i.e., a "snapshot") to application data 224 and/or network-connected storage provided, for example, by communication service provider platform 114 or application service provider platform 116.

The user controls can further include a snapshot slider 512. Snapshot slider 512 enables the user of electronic communication device 102 to easily review prior snapshots of Glass pane 312 in chronological order simply by dragging the slider to a desired point in the chronological history of the electronic communication between the user and the contact. Thus, historical states of a Glass pane 312 can be viewed as an animated sequence, showing the evolution of the data collection over time. As indicated, snapshot slider 512 may optionally further indicate (and the user may explicitly specify) the selected point in the snapshot chronology, for example, by day, date and/or time. The storage requirements of the snapshot chronology can be reduced, if desired, by storing only differences between at least some of the different states of the Glass pane 312 or by storing a maximum number of snapshots per chronological interval (e.g., one snapshot per day). In one preferred embodiment, prior snapshots within the snapshot chronology are not editable by a user, but a user is permitted to hide (or even delete) an unneeded snapshot, but only from their own view of the snapshot chronology. It should be appreciated that although an embodiment has been illustrated in which a global snapshot slider 512 is implemented for the entire data collection presented within a Glass pane 312, it should be appreciated that in other embodiments, snapshot sliders (or similarly functioning controls) can alternatively or additionally be implemented for one or more of the individual data elements within the data collection presented within Glass pane 312.

Although not explicitly illustrated in FIG. 5, the user controls can further include a presentation timing control and a notification control, which can be accessed, for example, via a menu tab, a pop-up menu, control icon, etc. Using the presentation timing control, a user that adds a data element to the data collection presented within a light Glass pane 312 (referred to herein as the "contributor") can specify when the data element is to become visible to the contact and/or when the data element is to be removed from the data collection. In one use case, the user can specify that a data element added to the data collection is to be made visible in one week, persist within the data collection for two weeks, and thereafter be removed from the data collection presented within a Glass pane 312. Using the notification control, the user can control, for example, whether or not the contact is to be explicitly notified regarding an update (e.g., insertion, deletion or modification) to the data collection (e.g., via an audible tone, a vibration, a device-level notification provided by communication endpoint 106, and/or a VSI of glass pane application 212), whether the notification is to be repeated if the contact does not view the update, and the number of times the notification is to be repeated.

The user controls available within a Glass pane 312 can optionally further include a propagation control. User selection of a data element within the Glass pane 312 and the propagation control enables the user to specify one or more light or dark Glass panes 312 for the same contact or different contact(s) to which the data element is to be propagated. Thus, if the user adds a data element to the data collection presented within one Glass pane 312, the user can designate (e.g., via selection boxes, menus, graphical selection, etc.) one or more additional Glass panes 312 in which the data element is to be presented without having to separately navigate to and enter the data element within each such additional Glass pane 312.

The user controls available within a Glass pane 312 can optionally further include a security control. For example, in one implementation, a user can cause a placeholder for a data element to be presented within a light Glass pane 312 such that the actual data element (e.g., a credit card number, bank account number, password, academic grade, or other confidential or sensitive information) is only presented by a communication endpoint 106 to a contact in response to entry of a password. In some implementations, the security control can additionally be utilized to control encryption of the data element, such that the data element can be viewed "in the clear" at electronic communication device 102 and communication endpoint 106, but is encrypted and thus not readily discernable to intermediary systems such as communication service provide platform 114 and application service provider platform 116.

Figure 6:
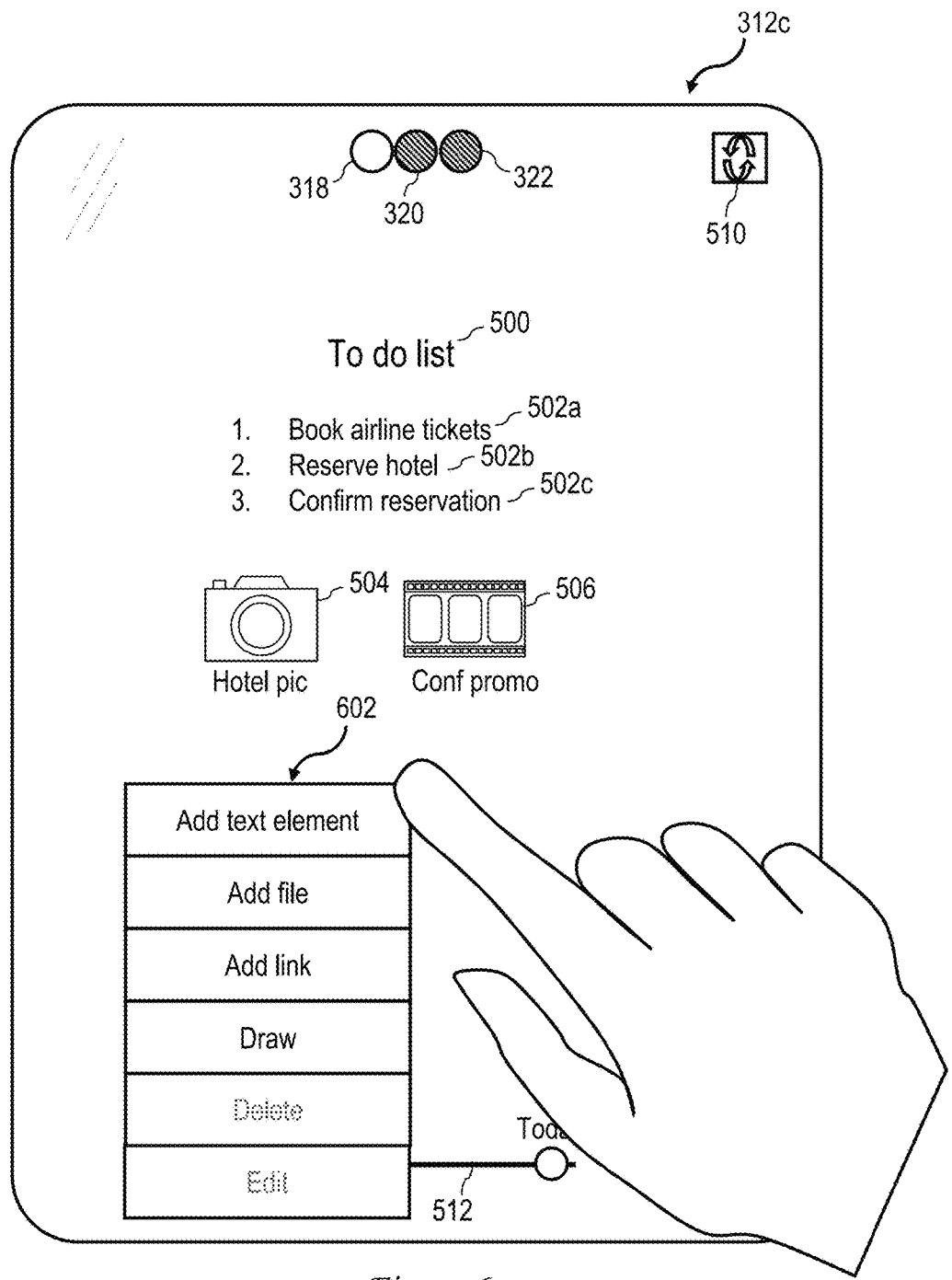
FIG. 6 depicts another view of a Glass pane, which illustrates an exemplary technique of updating content of a Glass pane in accordance with one embodiment.

Referring now to FIG. 6, there is depicted another view of a Glass pane 312c, which illustrates a technique that can be employed by electronic communication device 102 to permit a user to update content of Glass pane 312c in accordance with one embodiment. In the illustrated embodiment, if an existing data element on the Glass pane presented within Glass pane 312c is selected by a tap (as opposed to a persistent selection in which a touch has a duration longer than a predetermined interval), electronic communication device 102 permits the user to relocate the data element within Glass pane 312c (and/or optionally to drag the data element onto a virtual desktop or into another window, such as another Glass pane 312).

In response, however, to detection of a persistent selection of a point within Glass pane 312c (e.g., by touch-sensitive display 110 detecting a persistent touch of a finger or stylus within the boundaries of Glass pane 312c), electronic communication device 102 presents a pop-up menu 602 including a number of options, such as "Add text element," "Add file," "Add link," "Draw," "Delete," and "Edit". If the point selected by the persistent selection corresponds to an existing data element, options such as "Edit" and "Delete" are selectable, while others such as "Add . . . " and "Draw" are made unselectable (e.g., "grayed out"). If the point selected by the persistent selection corresponds to an unoccupied location within Glass pane 312 (as specifically illustrated in FIG. 6), electronic communication device 102 makes options such as "Add . . . " and "Draw" selectable, and makes options such as "Edit" and "Delete" unselectable (e.g., "grayed out"). In response to user selection of one of the selectable options within pop-up menu 602, electronic communication device 102 can present one or more additional graphical components (e.g., virtual keyboard, file selection window, etc.) within display 110 to facilitate updating of the content of Glass pane 312.

Figure 7:
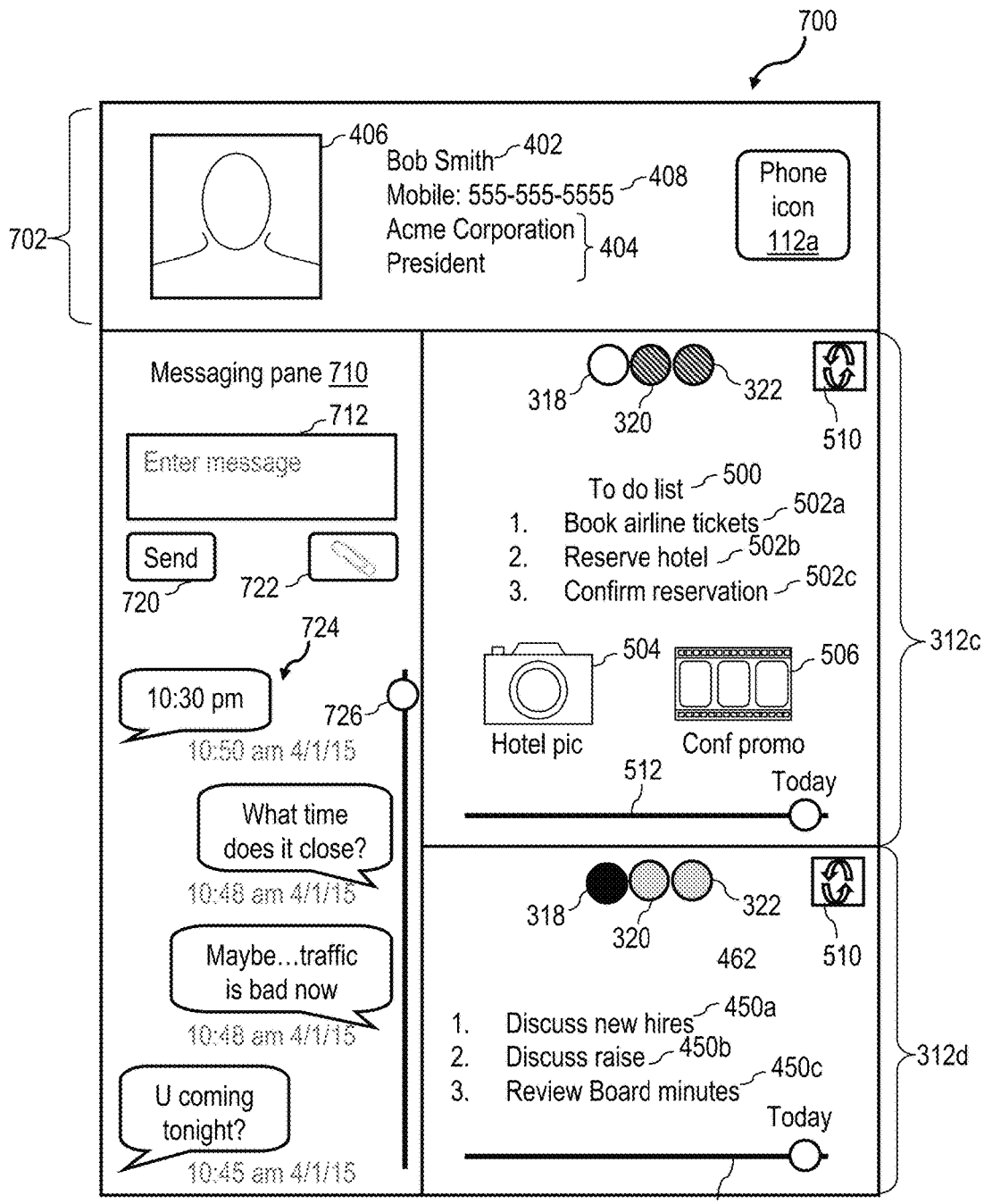
FIG. 7 depicts a first view of an exemplary graphical user interface of a composite communication portal in accordance with one embodiment.

With reference now to FIG. 7, there is illustrated an exemplary graphical user interface 600 of a composite collaborative communication portal in accordance with one embodiment. Electronic communication device 102 may present graphical user interface 700 within display 110 through the execution of one or more of contact management application 218, voice communication application 208, Glass pane application 212 and messaging application 210, for example, in response to user selection of expander control 422 of FIG. 4 or user initiation of telephone call by selection of a phone icon 112a presented on the virtual desktop within display 110 or within a virtual card 306 of contact management application 218.

In the depicted embodiment, graphical user interface 700 includes a contact pane 702 (which may be presented through execution of contact management application 218) in which electronic communication device 102 presents one or more selected contact data fields, such as a contact name 402, contact description 404, thumbnail image 406, and phone number 408. Contact pane 702 may further include a phone icon 112a, which can be selected by a user to initiate a voice (or video) call to the contact.

In addition, graphical user interface 700 may include a messaging pane 710, which may be presented through execution of messaging application 210. Messaging pane 710 includes a text entry field 712 in which the user of electronic communication device 102 can compose a text message to the contact identified in contact pane 702. Text entry field 712 has an associated send button 720 that is selected to initiate transmission of the text message entered within text entry field 712 and an associated attachment button 722 that can be selected by the user to permit attachment of a file (e.g., an image, document, video, etc.) to the text message. Messaging pane 710 additionally includes a chronologically arranged thread 724 of text messages exchanged between the user and the contact. As indicated, individual messages comprising the thread may optionally be presented in association with a time and date stamps to provide the user with an accurate chronology of electronic communication. Messaging pane 710 may further be equipped with additional graphical controls and/or indicia, such as scroll bar 726, in order to further indicate to the user the chronological recency of the portion of the thread currently presented within messaging pane 710.

Figure 8:
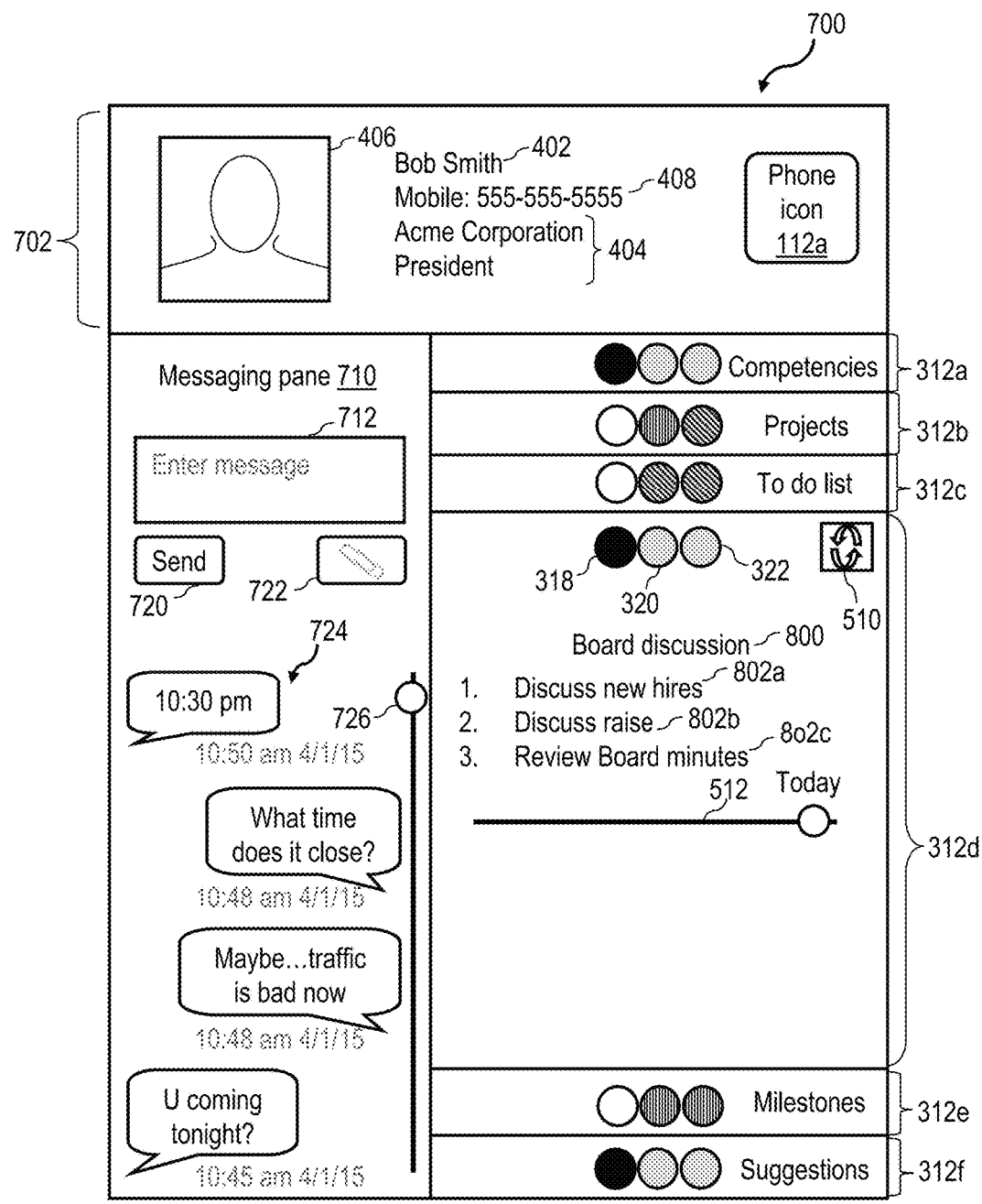
FIG. 8 illustrates a second view of the exemplary graphical user interface of a composite communication portal in accordance with one embodiment.

In the depicted example, graphical user interface 700 further includes one or more Glass panes 312 associated with the contact identified in contact pane 402, where the Glass panes 312 may be presented, for example, through execution of Glass pane application 212. In at least some embodiments, fewer than all of Glass panes 312 are presented within graphical user interface 700, for example, based on user selection of the Glass panes 312 to be included or default selection of Glass panes 312 based on recency of access. For example, FIG. 7 illustrates a use case in which only light Glass pane 312c and dark Glass pane 312d are included within graphical user interface 700. In alternative embodiments, as shown in FIG. 8, graphical user interface 700 may present all of Glass panes 312a-312f within graphical user interface 700 as individually selectable tabs, with only one of the Glass panes 312 (e.g., a Glass pane 312d containing a title 800 ("Board Discussion") and three textual data elements 802a-802c) being presented in expanded form at any one time.

With additional reference now to FIGS. 9-12, there is illustrated a high level logical flowchart of an exemplary method of electronic communication implemented by an electronic communication device 102 in accordance with one embodiment. As a logical flowchart, process steps are presented in logical rather than strictly chronological order, and it should be appreciated that at least some of the illustrated steps may be performed concurrently or in a different order than shown. The illustrated process can be implemented, for example, in hardware components (including programmable hardware components, such as programmable logic arrays (PLAs) and field programmable gate arrays (FPGAs)) of electronic communication device 102 and/or by the execution of program code (e.g., software and/or firmware) by the hardware components of electronic communication device 102.

Figure 9:
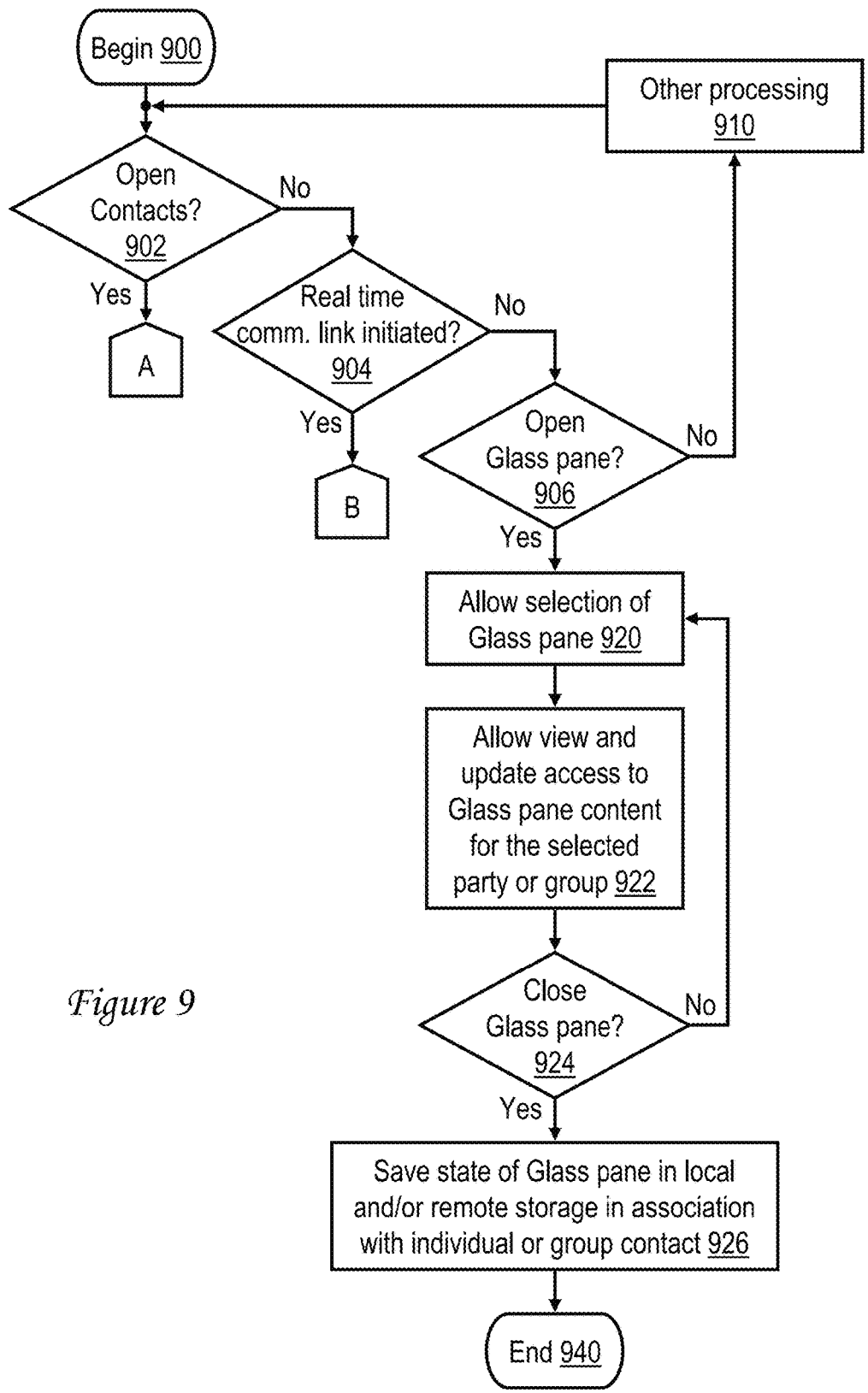
FIGS. 9-12 together form a high level logical flowchart of an exemplary process by which an electronic communication device can support collaborative electronic communication in accordance with one embodiment.

The process of FIG. 9 begins at block 900 and then proceeds to block 902, which depicts electronic communication device 102 determining whether or not contact management application 218 has been opened, for example, by the user selecting contacts icon 112f. If so, the process passes through page connector A to FIG. 10, which is described below. If not, the process passes to block 904, which depicts electronic communication device 102 additionally determining whether or not a real-time electronic communication link has been initiated, for example, by a user selecting phone icon 112a or messaging icon 112b or by electronic communication device 102 receiving an incoming call or text message. In some embodiments, the real-time electronic communication links detected at block 904 are restricted to those including audio communication (e.g., voice and/or video calls). In response to an affirmative determination at block 904, the process proceeds through page connector B to FIG. 12, which is described below. In response to a negative determination at block 904, the process passes to block 906, which illustrates electronic communication device 102 additionally determining whether or not Glass pane application 212 has been opened, for example, by a user selecting Glass pane icon 112c or by persistent selection of a Glass pane 312 in graphical user interface 300 of FIG. 3 or virtual card 306 of FIG. 4. If so, the process passes to block 920 and following blocks, which are described below. If not, electronic communication device 102 performs other processing (block 910) and continues to monitor for one of the conditions illustrated at blocks 902-906 as illustrated by the process returning from block 910 to block 902.

Referring now to block 920, in response to the opening of Glass pane application 212, electronic communication device 102 permits the selection of a particular Glass pane 312 associated with a contact corresponding to an individual party or group. If Glass pane application 212 is invoked from Glass pane icon 112c, then electronic communication device 102 can permit the Glass pane 312 to be selected, for example, through graphical user interface 300 or another similar interface. If, on the other hand, Glass pane application 212 is invoked through the selection of a Glass pane 312 within Glass pane field 424 of a virtual card 306, then no additional selection is required.

In response to selection of a Glass pane 312, electronic communication device 102 presents the Glass pane 312 within display 110 (as shown, for example, in FIGS. 5-6) and allows the user of electronic communication device 102 to view and to add to the data elements within the current state of the Glass pane 312. As noted above, if the selected Glass pane 312 is a light Glass pane 312, then the data collection presented within the Glass pane 312 is also subject to concurrent real time updates by the associated contact. In addition, electronic storage device 102 enables the user, subject to rules applicable to this individual Glass pane 312 (or, in some embodiments, all Glass panes 312 of this user), to delete and/or to modify the data elements within the current state of the Glass pane 312. An exemplary methodology of rules-based modification/update of a Glass pane is described below with reference to FIGS. 13-15. As indicated by decision block 924, the process of viewing and/or updating a Glass pane 312 can be repeated for one or more additional selected Glass panes 312 associated with one or more contacts until electronic communication device 102 receives a request to close Glass pane application 212. At least in response to a request to close Glass pane application 212 (and optionally at other times during the execution of Glass pane application 212), electronic communication device 102 saves the state of any Glass panes 312 updated in the processing depicted at block 922 (block 926). As noted above, the current state of the Glass pane 312 can be recorded in data storage 220 local to electronic communication device 102 and/or on network-connected storage (e.g., at communication service provider platform 114 and/or application service provider platform 116) and/or synchronized with communication endpoint(s) 106 associated with the parties or groups with which the Glass panes are shared. Thereafter, the process of FIG. 9 ends at block 940 until one of the inputs indicated at block 902-906 is again detected.

Figure 10:
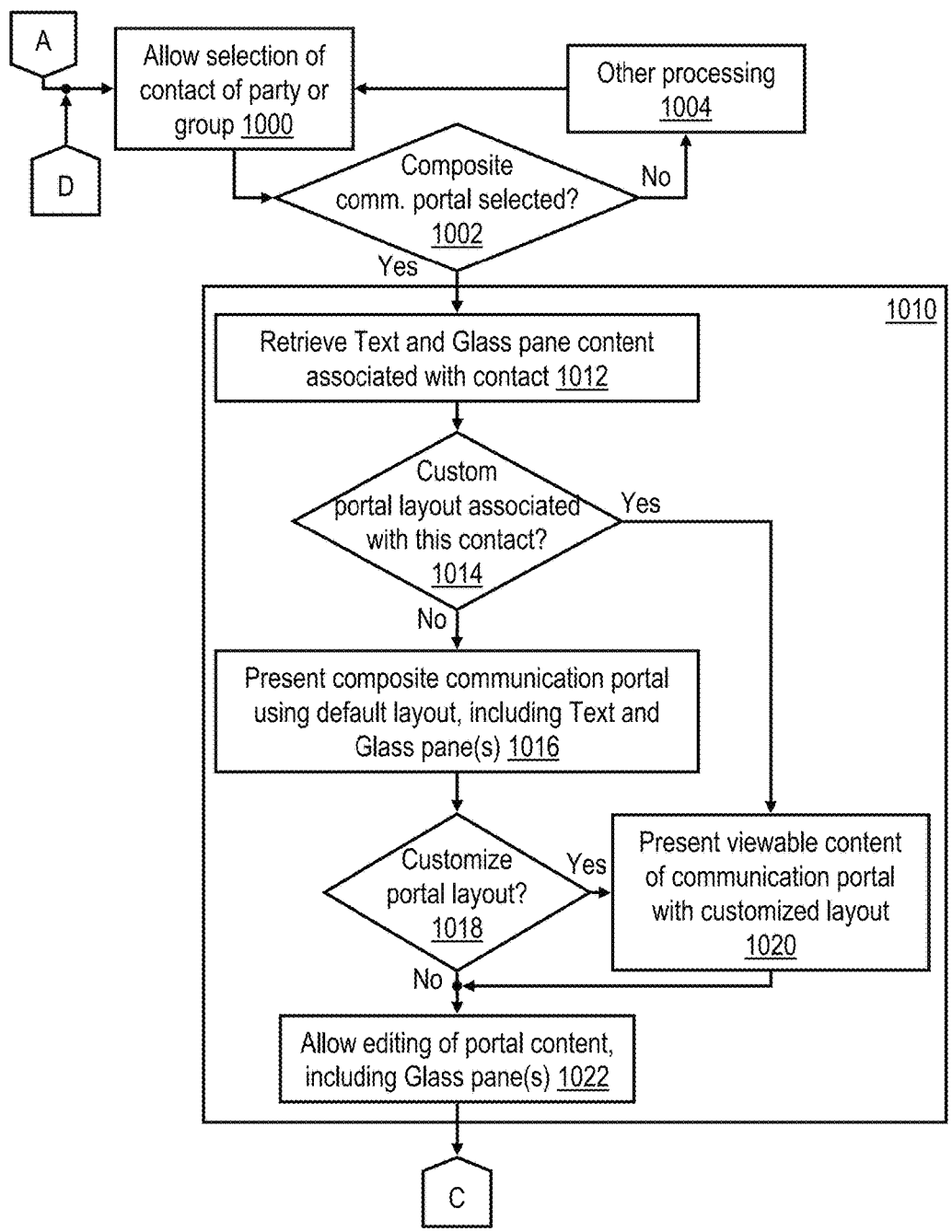

With reference now to FIG. 10, following page connector A, the process proceeds to block 1000, which illustrates electronic communication device 102 permitting a user of electronic communication device 102 to select a contact of an individual party or group from the contact list maintained by contact management application 218, for example, through graphical user interface 300 of FIG. 3. In response to selection of a contact from the contact list (e.g., via selection of the virtual card 306 associated with the contact), electronic communication device 102 presents a graphical user interface, such as virtual card 306d of FIG. 4, in display 110. At block 1002, electronic communication device 102 determines whether or not presentation of the composite communication portal 700 (e.g., as shown in FIGS. 7-8) has been selected, for example, using expander control 422. If not, electronic communication device 102 performs other processing, for example, permitting viewing and/or editing of the contact data (block 1004). The process thereafter returns from block 1004 to block 1000, which has been described.

In response to electronic communication device 102 determining at block 1002 that presentation of composite communication portal 404 has been selected, the process of FIG. 10 proceeds from block 1002 to block 1010, which generally illustrates electronic communication device 102 presenting a composite communication portal (e.g., as shown in FIGS. 7-8) within display 110. As illustrated, the presentation of the composite communication portal at block 1010 can include a number of subsidiary steps. For example, at block 1012, electronic communication device 102 retrieves, from local and/or remote data storage, the thread of text messages between the user and the contact and one or more Glass pane 312 associated with the contact. Electronic communication device 102 then presents the retrieved data within display 110 in either a default or customized layout. For example, at block 1014, electronic communication device 102 determines whether the user has established a custom layout for this contact (or, in some embodiments, for multiple contacts including this contact). In some embodiments, the user may establish a custom layout of the composite communication portal by exiting the composite communication portal after having modified the layout (e.g., the location and/or sizes of panes 702, 710, and 312) from the default layout shown in FIGS. 7 and 8. This customized layout can be stored as a portion of settings 222 or application data 224. In response to electronic communication device 102 determining that the user has not established a custom layout applicable to the currently selected contact, electronic communication device 102 initially presents messaging pane 710 and Glass pane(s) 312 utilizing the default layout (e.g., the layout shown in FIGS. 7-8) (block 1016), but permits the user the customize the portal layout as discussed above (block 1018). If, however, electronic communication device 102 determines at block 1014 or block 1018 that the user has established a custom layout of the composite communication portal, electronic communication device 102 presents the viewable content of the composite communication portal utilizing the custom layout (block 1020). Following block 1018 or block 1022, the process proceeds through page connector C to FIG. 11.

Figure 11:
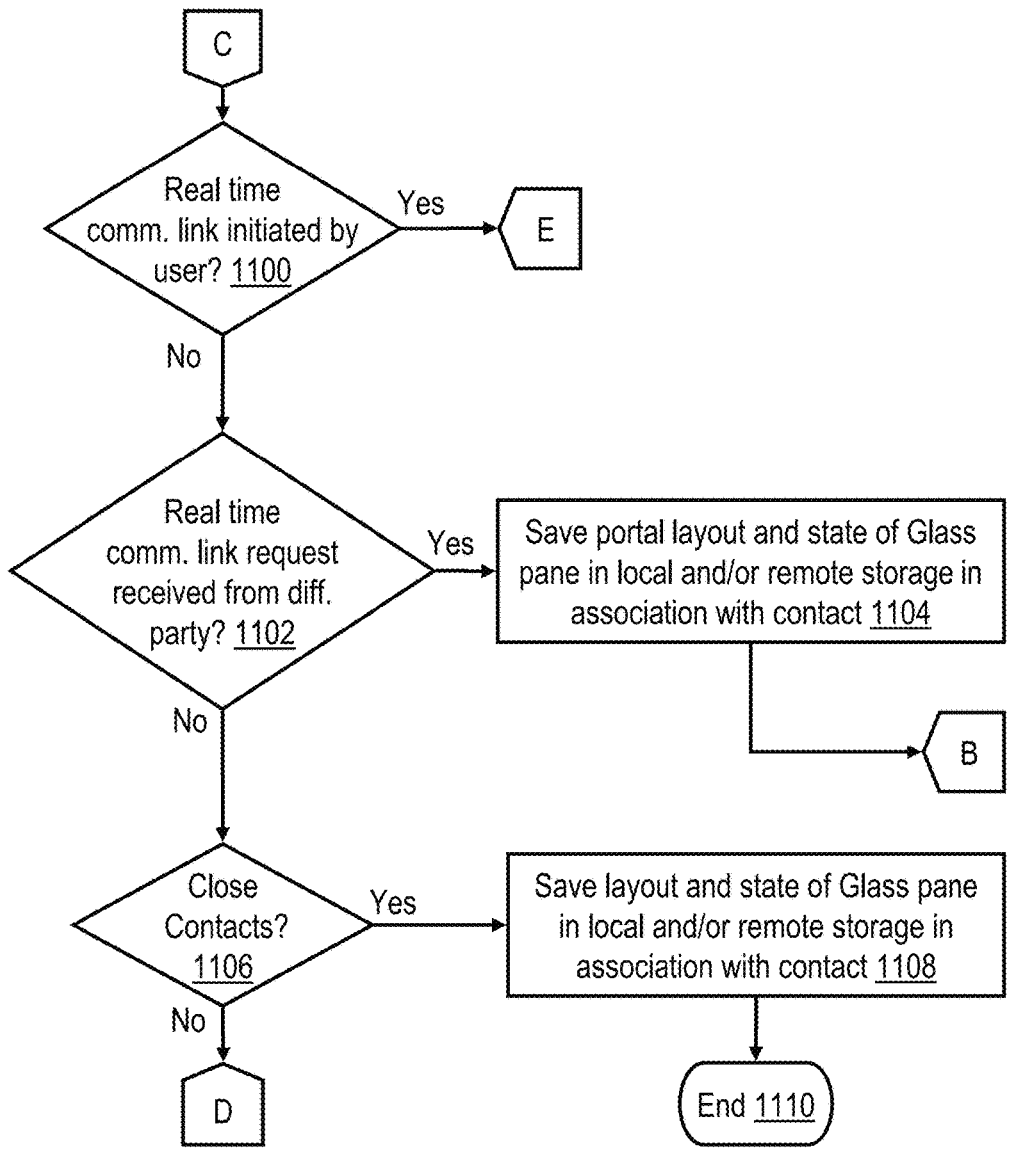

In FIG. 11, following page connector C, electronic communication device 102 determines at block 1100 whether or not a real-time electronic communication link has been initiated between electronic communication device 102 and a communication endpoint 106 of the contact, for example, by user selection of phone icon 112*a* in header 402. If so, the process passes through page connector E to FIG. 12, which is described below.

Referring now to block 1102, electronic communication device 102 determines whether or not it has received an incoming phone or video call from a communication endpoint 106 associated with a different party than the currently selected contact. If not, the process passes to block 1106, which is described below. If, however, electronic communication device 102 determines at block 1102 that its has received an incoming phone or video call from a communication endpoint 106 associated with a different party than the currently selected contact, the process proceeds to block 1104, which depicts electronic communication device 102 saving the layout of the composite communication portal (in some embodiment, the layout need not be saved if the composite communication portal retains the default layout). In addition, electronic communication device 102 takes a snapshot of the open Glass pane(s) 312, if needed to preserve modification(s) to the Glass pane(s) 312. As noted above, the current states of the Glass pane(s) 312 associated with the contact can be recorded in data storage 220 local to electronic communication device 102 and/or on network-connected storage (e.g., at communication service provider platform 114 and/or application service provider platform 116). Thereafter, the process of FIG. 11 passes through page connector B to FIG. 12, which is described below.

At block 1106 electronic communication device 102 determines whether or not the user has requested that contact management application 218 be closed. If not, the process passes through page connector D to FIG. 10, which has been described. If, however, electronic communication device 102 determines at block 1106 that the user has requested that contact management application 218 be closed, the process proceeds to block 1108. Block 1108 illustrates electronic communication device 102 saving the layout of the composite communication portal (in some embodiment, the layout need not be saved if the composite communication portal retains the default layout). In addition, electronic communication device 102 takes a snapshot of the open Glass pane(s) 312, if needed to preserve modification(s) to the Glass pane(s) 312. As noted above, the current states of the Glass pane(s) associated with the contact can be recorded in data storage 220 local to electronic communication device 102 and/or on network-connected storage (e.g., at communication service provider platform 114 and/or application service provider platform 116). Thereafter, the process of FIG. 11 ends at block 1110.

Figure 12:
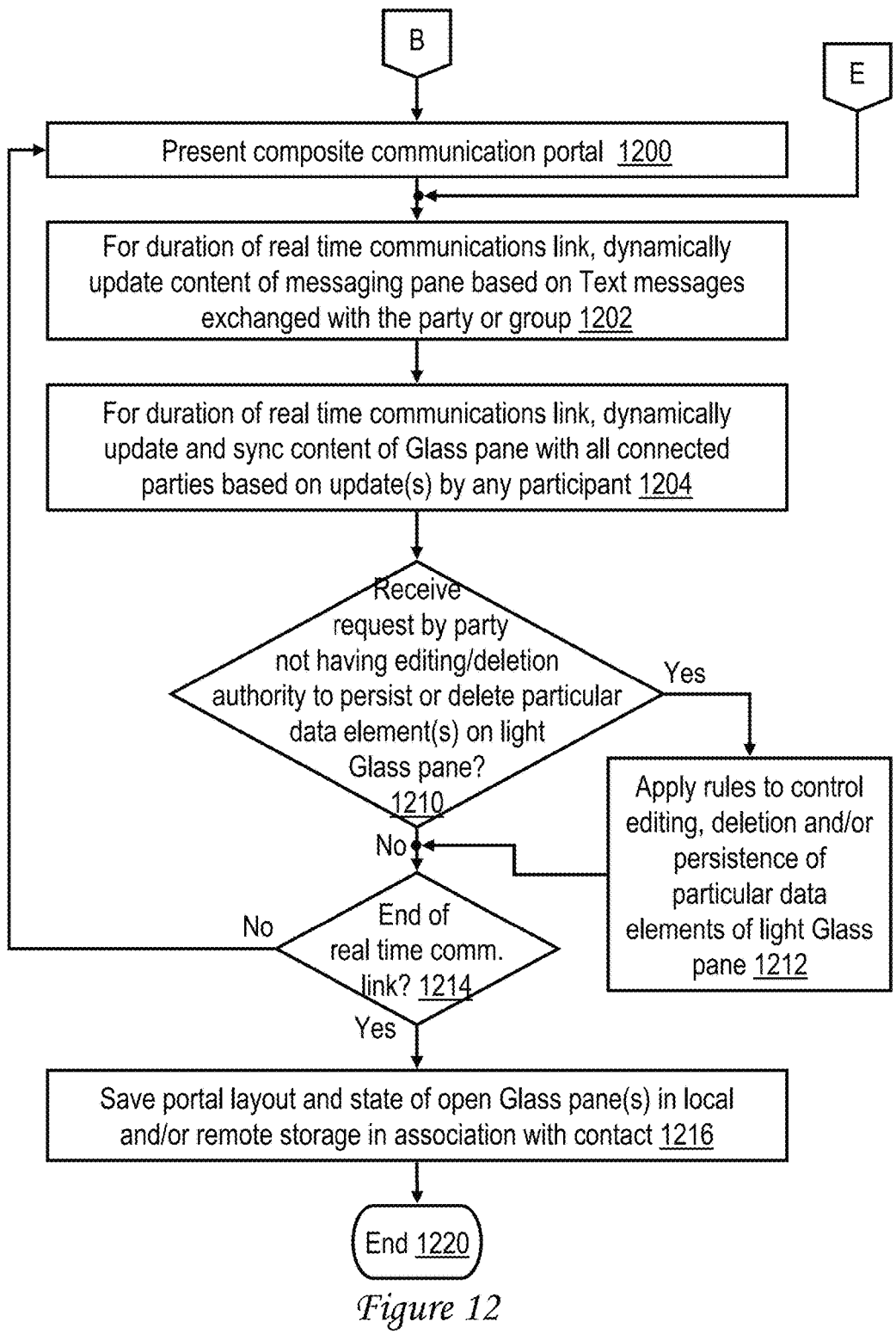

With reference now to FIG. 12, the process begins at page connector B and then proceeds to block 1200, which depicts electronic communication device 102 presenting a composite communication portal including content, if available, for the contact with which a real-time communication link is being established. As will be appreciated, block 1200 may include the same or similar subsidiary steps as those illustrated in block 1010 of FIG. 10.

Following block 1200 or following page connector E, during the duration of the real-time electronic communication link, electronic communication device 102 dynamically updates the contents presented within the composite communication portal. As shown at block 1202, these dynamic updates include dynamic updates to messaging pane 410 to include any text messages exchanged between the electronic communication device 102 and the communication endpoint(s) 106 associated with other party or parties participating in the electronic communication over the real-time electronic communication link. Further, as shown at block 1204, the dynamic updates to the content presented in the composite communication portal includes any updates (e.g., additions, edits, and/or deletions) to the collaborative content of Glass pane 312 made by any party participating in the electronic communication over the real-time electronic communication link.

Referring now to block 1210, in some embodiments, at least some types of updates and/or updates to particular data element on the Glass pane 312 may be restricted, such that the updates can be made by fewer than all parties or can be made only in response to receipt of authorization to make the update from another party. Thus, while in some embodiments, any party to electronic communication via the real-time electronic communication link can make any desired update (e.g., addition, editing, and/or deletion of data element(s)) to the collaborative content of a light Glass pane 312, in other embodiments one or more of such updates may be restricted for one or more of the parties based on a rule set applicable to the light Glass pane 312. For example, in one exemplary role-based rule set, any party can freely add data elements to the light Glass pane 312 as the "contributor" of those data elements, can freely edit or delete data elements for which that party is the contributor, but can edit or delete data elements for which another party is the contributor only upon authorization by the other party. In the same or another rule set, a party referred to herein as a "subscriber," may also make a request to persist a data element on the light Glass pane 312 for which another party is the contributor, meaning that the contributor that added the data element to the light Glass pane 312, in response to agreeing to persist the data element, can only edit or delete the data element from the light Glass pane 312 in response to authorization from the subscriber who requested to persist the data element.

At block 1210, electronic communication device 102 determines whether or not it has received, from a party not having authority under the applicable rule set to edit or delete a data element, a request to edit, delete or persist the data element on a light Glass pane 312. If not, the process passes from block 1210 to block 1214. If so, the process proceeds from block 1210 to block 1212, which illustrates electronic communication device 102 applying the applicable rule set to resolve the request. The process then proceeds to block 1214.

Block 1214 illustrates electronic communication device 1214 determining whether or not the real-time electronic communication link has terminated, for example, due to the user of electronic communication device 102 or another party terminating a voice or video call or a predetermined period time elapsing without any activity in any open light Glass pane(s) 312 and/or messaging pane 710. If not, the process returns to block 1200 and following blocks, which have been described. If, however, electronic communication device 102 determines at block 1214 that the real-time electronic communication link has terminated, the process proceeds to block 1216. Block 1216 depicts electronic communication device 102 saving the layout of the composite communication portal (in some embodiment, the layout need not be saved if the composite communication portal retains the default layout). In addition, electronic communication device 102 takes a snapshot of the open Glass pane(s) 312, if needed to preserve any modification(s) to the open Glass pane(s) 312. As noted above, the current states of the open Glass pane(s) 312 associated with the contact can be recorded in data storage 220 local to electronic communication device 102 and/or on network-connected storage (e.g., at communication service provider platform 114 and/or application service provider platform 116). Thereafter, the process of FIG. 12 ends at block 1220.

Figure 13:
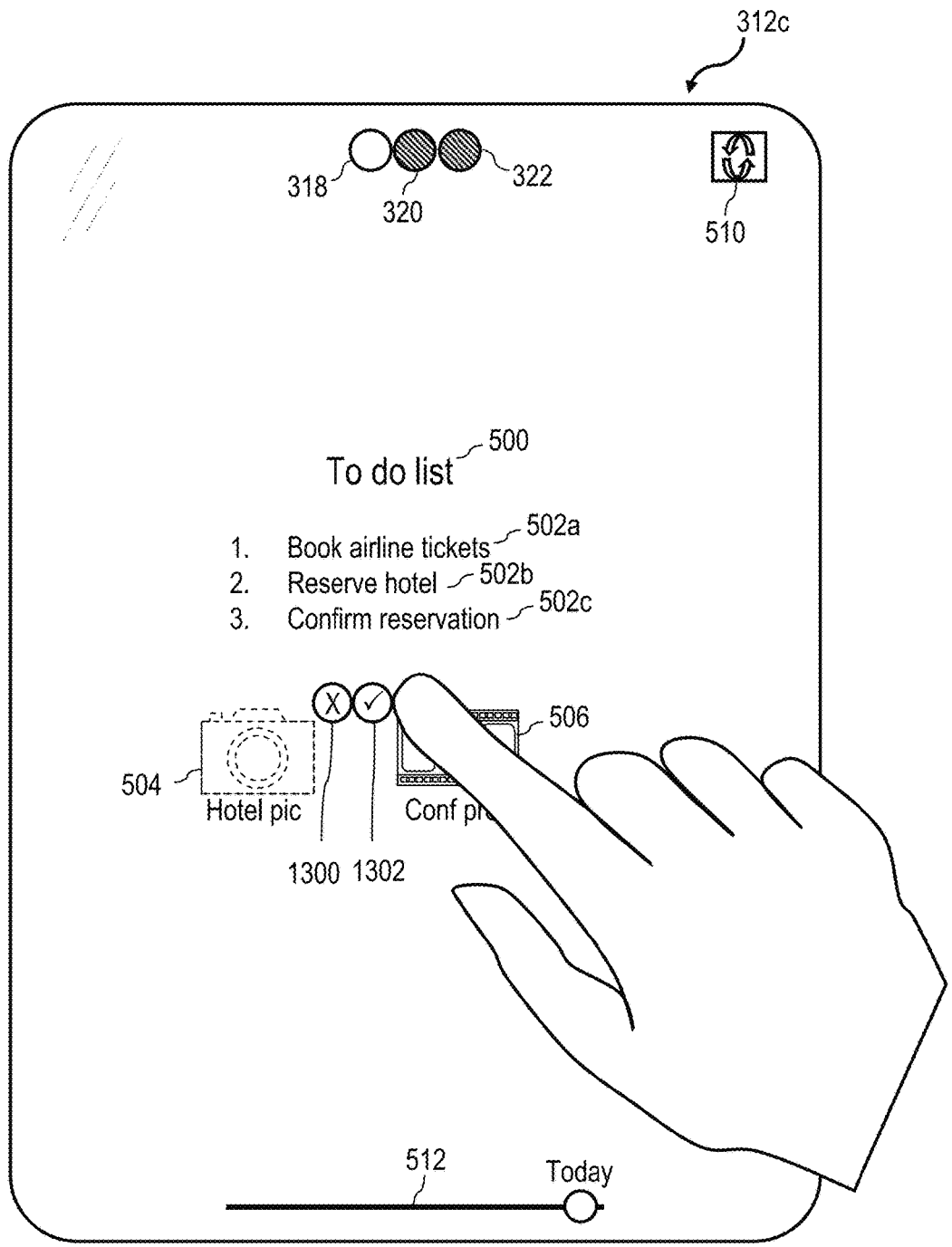
FIG. 13 illustrates yet another view of a Glass pane, which depicts an exemplary technique of rules-based editing of content of the Glass pane.

Turning now to FIG. 13, there is illustrated another view of Glass pane 312c, which illustrates a technique by which electronic communication device 102 can implement rules-based editing of a Glass pane 312. The second view given in FIG. 13 assumes that the user or a contact sharing light Glass pane 312c has added title 500, data elements 502a-502c, 504, and 506, for example, utilizing the technique described above with reference to FIG. 6.

For example, assuming that the user of electronic communication device 102 has added image (or image placeholder) 504 to light Glass pane 312c, a contact sharing light Glass pane 312c may desire to remove image 504 from light Glass pane 312c, but be prohibited from doing so due to the rules applicable to light Glass pane 312c, which permit only the party that added a data element to light Glass pane 312c (i.e., the contributor) to remove that data element. According to one embodiment, the Glass pane application 212 executing on the remote communication endpoint 106 of the contact nevertheless permits the contact lacking authority to remove (delete) a data element from the Glass pane to propose (request) its removal, for example, through selection of a "Delete" option from a pop-up menu 602 or through an alternative editing technique. In response to receipt of such a removal request, the Glass pane application 212 executing on electronic communication device 102 may modify the presentation of image 504, for example, by modifying a color, line weight, transparency, or other graphical attribute of image 504, and/or by presenting an additional graphical control. In the particular example given in FIG. 13, Glass pane application 212 graphically communicates the existence of a pending request to remove image 504 from Glass pane 312c both by modifying the presentation of image 504 to use dashed line illustration and by presenting a reject control 1300 and an accept control 1302 in association with image 504. Thus, if the user of electronic communication device 102 concurs with (i.e., authorizes) removal of image 504 from Glass pane 312c, the user can select accept control 1302, and if the user of electronic communication device 102 denies the request to remove image 504, the user can select reject control 1300. In response to selection of reject control 1300, Glass pane application 212 restores image 504 to its original appearance, and through synchronization, causes the appearance of the corresponding image at the communication endpoint 106 of the contact to similarly be restored. In response to selection of accept control 1302, Glass pane application 212 removes image 504 from light Glass pane 312c, and through synchronization, causes the corresponding image to be similarly removed from the Glass pane at the communication endpoint 106 of the contact. It should be appreciated that the described technique of rules-based editing limits or eliminates editing conflicts between the parties collaborating on a light Glass pane 312.

A similar technique may also be utilized to persist a desired data element on a light Glass pane 312. As noted above, one party collaborating on a light Glass pane 312 may desire that a data element continue to be presented on the light Glass pane 312 and not unilaterally deleted by another party. In this case, the party may make a persistence request, for example, through selection of a corresponding pop-up menu option displayed by Glass pane application 212 in response to selection of the data element on the light Glass pane 312.

Figure 14:
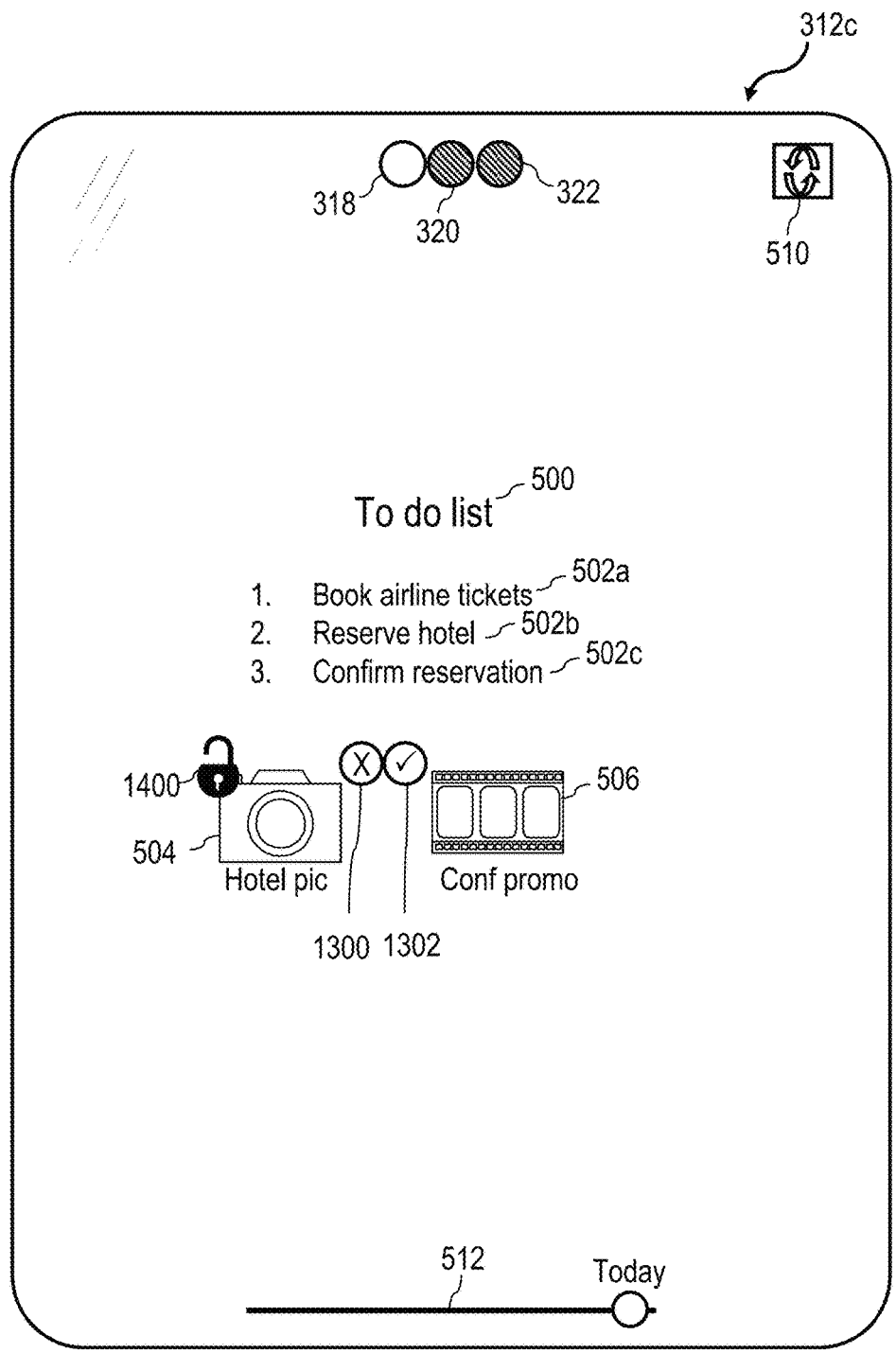
FIGS. 14-15 depict additional views of a Glass pane, which illustrate an exemplary technique of persisting content on the Glass pane.
Figure 15:
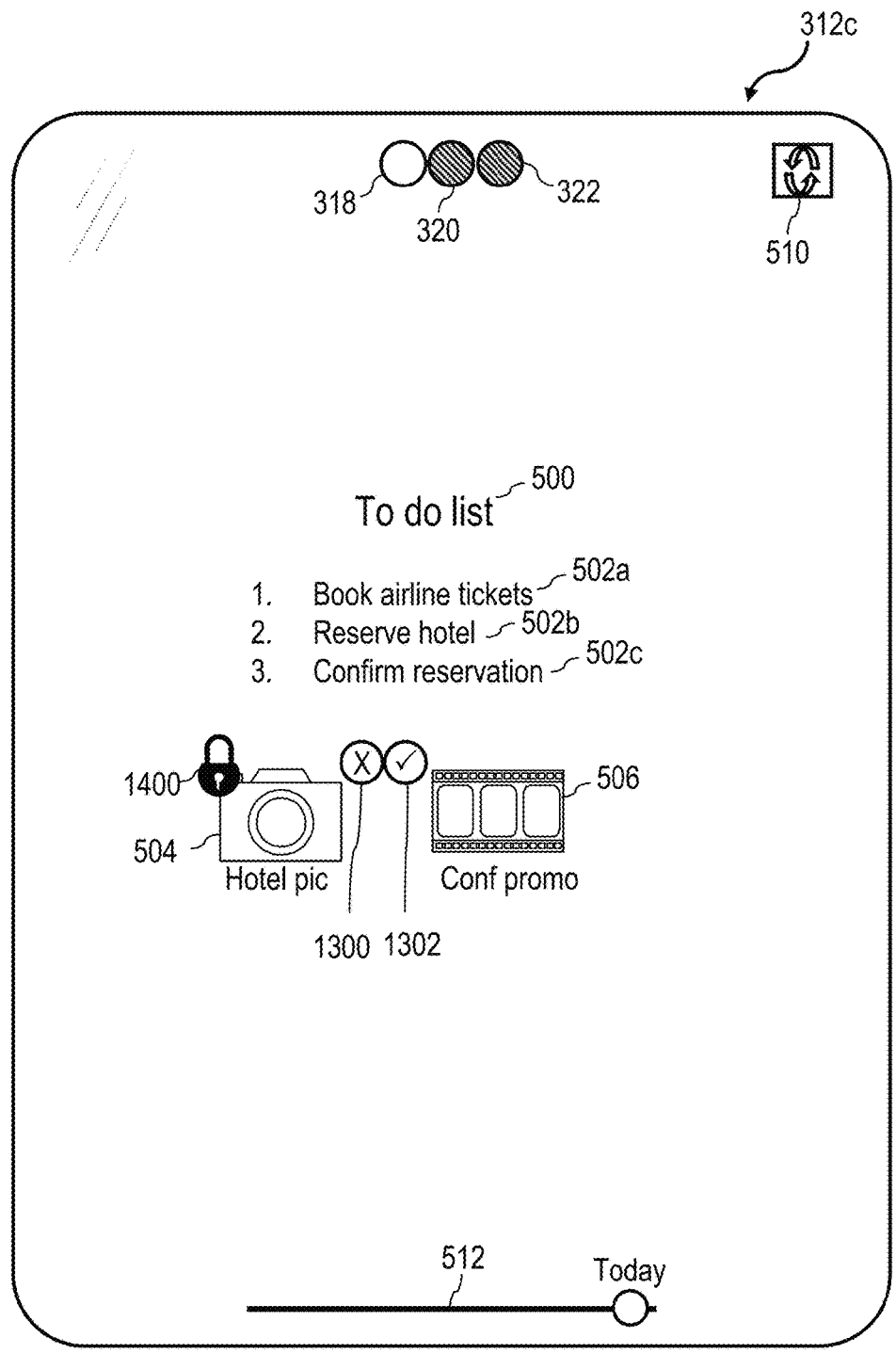

Referring now to FIG. 14, a third view of Glass pane 312c is depicted in which a contact sharing light Glass pane 312c has requested that image 04 (which the user of electronic communication device 102 has authority to unilaterally delete) be persisted on light Glass pane 312c. In response to receipt of the persistence request from the Glass pane application 212 executing on the remote communication endpoint 106 of the contact, the Glass pane application 212 executing on electronic storage device 102 may modify the presentation of image 504, for example, by modifying a color, line weight, transparency, or other graphical attribute of image 504, and/or by presenting an additional graphical control. In the particular example given in FIG. 14, Glass pane application 212 graphically communicates the existence of a pending persistence request by presenting a lock icon 1400 in an "unlocked" state, a reject control 1300, and an accept control 1302 in association with image 504. If the user of electronic communication device 102 concurs with (i.e., authorizes) persisting image 504 on light Glass pane 312c, the user can select accept control 1302, and if the user of electronic communication device 102 denies the request to persist image 504, the user can select reject control 1300. In response to selection of reject control 1300, Glass pane application 212 discontinues presentation of lock icon 1400 in association with image 504 (and if altered, restores image 504 to its original appearance), and through synchronization, causes the appearance of the corresponding image at the communication endpoint 106 of the contact to similarly be updated. In response to selection of accept control 1302, Glass pane application 212 preferably updates light Glass pane 312 to indicate persistence of image 504 (e.g., through updating lock icon 1400 to indicate a "locked" state as shown in FIG. 15), and through synchronization, causes the corresponding image presented on the Glass pane at the communication endpoint 106 of the contact to be similarly updated.

As has been described, in some embodiments, an electronic communication device detects initiation of a real-time communication link between the electronic communication device and a communication endpoint via a communication network. In response to the detecting, the electronic communication device automatically presents, within a display associated with the electronic communication device during a duration of the real-time communication link, a communication portal including at least a Glass pane containing a collaborative collection of data elements shared between and updatable by both a user of electronic communication device and a party associated with the communication endpoint. During a duration of the real-time communication link, the electronic communication device synchronizes data elements presented within the Glass pane between electronic communication device and the communication endpoint such that an update to the data collection is presented both within the Glass pane of the display and at the communication endpoint.

While various inventions have been particularly shown as described with reference to one or more preferred embodiments, it will be understood by those skilled in the art that various changes in form and detail may be made therein without departing from the spirit and scope of the invention. For example, although various embodiments have been described in which various functions are performed through the execution of one or more applications on an electronic communication device, it should be appreciated that in other embodiments the inventive functions may be performed on an application service provider platform 116 accessed by the electronic communication device, for example, through execution of a browser application 216 or other remote access software. Similarly, it should be appreciated that the described functions need not all be performed on a single physical platform, but can instead be performed on multiple communicatively coupled physical platforms (e.g., which may be communicatively coupled via short range communication interfaces 232).

The inventions disclosed herein may be realized as a system, a method, and/or a computer program product. A computer program product may include a computer-readable storage device having computer-readable program code stored thereon for causing a processor to carry out aspects of the inventions. The computer-readable storage device may be, for example, an electronic storage device, a magnetic storage device, an optical storage device, an electromagnetic storage device, a semiconductor storage device, or any suitable combination of the foregoing. Specific examples of the computer-readable storage device include a portable computer diskette, hard disk, random access memory (RAM), static random access memory (SRAM), read-only memory (ROM), an erasable programmable memory (EPROM or Flash memory), compact disc (CD), digital versatile disk (DVD), and a memory stick. A computer-readable storage device, as used herein, is not to be construed as being a transitory signal per se, such as a radio wave or other freely propagating electromagnetic wave, electromagnetic wave propagating through a waveguide or other transmission media (e.g., a light pulse passing through a fiber optic cable), or an electrical signal transmitted through a wire.

What is claimed is:

1. A method of data processing in an electronic communication device, the method comprising:
   detecting initiation of a real-time communication link between the electronic communication device and a communication endpoint via a communication network;
   in response to the detecting, the electronic communication device automatically presenting, within a display associated with the electronic communication device during a duration of the real-time communication link, a communication portal including at least:
      a first Glass pane containing a collaborative collection of data elements shared between and updatable by both a user of the electronic communication device and a party associated with the communication endpoint; and
      a second Glass pane in which a private data collection of the user is presented, wherein the private data collection is uniquely associated with the party associated with the communication endpoint;
   presenting within the display in association with the first Glass pane a messaging pane in which a chronological thread of text messages between the electronic communication device and the communication endpoint is presented;
   during the duration of the real-time communication link, the electronic communication device synchronizing the data elements in the collaborative collection of data elements presented within the first Glass pane between the electronic communication device and the communication endpoint, such that any update to the collaborative collection of data elements made at the communication endpoint is presented both within the first Glass pane of the display and at the communication endpoint and any update to the collaborative collection of data elements made at the electronic communication device is presented both within the first Glass pane of the display and at the communication endpoint; and
   at conclusion of the real-time communication link, the electronic communication device storing in data storage, in association with the party associated with the communication endpoint, a state of the first Glass pane.

2. The method of claim 1, wherein the real-time communication link includes a voice communication link.

3. The method of claim 1, wherein the synchronizing includes pushing the update to at least one of the electronic communication device and a network-connected third party platform.

4. The method of claim 1, and further comprising the electronic communication device controlling editing of the data elements presented within the first Glass pane through application of one or more role-based rules.

5. The method of claim 4, wherein:
   the user associated with the electronic communication device is a contributor of a data element among the collaborative collection of data elements presented within the first Glass pane;

the party associated with the communication endpoint is a subscriber of the data element; and said controlling editing includes:

the electronic communication device permitting removal of the data element from the first Glass pane only in response to receipt of authorization from the subscriber.

6. The method of claim 4, wherein controlling editing includes persisting a data element among the collaborative collection of data elements presented within the first Glass pane in response to receipt of an approval of a persistence request.

7. An electronic communication device, comprising:

a processor core;

a network interface;

a display controller coupled to the processor core and to a display; and audio circuitry coupled to the processor core;

wherein the processor core is configured to:

detect initiation of a real-time communication link between the electronic communication device and a communication endpoint via a communication network; in response to detecting initiation of the real-time communication link, automatically present, within the display associated with the electronic communication device during a duration of the real-time communication link, a communication portal including at least:

a first Glass pane containing a collaborative collection of data elements shared between and updatable by both a user of electronic communication device and a party associated with the communication endpoint; and a second Glass pane in which a private data collection of the user is presented, wherein the private data collection is uniquely associated with the party associated with the communication endpoint;

present within the display in association with the first Glass pane a messaging pane in which a chronological thread of text messages between the electronic communication device and the communication endpoint is presented;

during the duration of the real-time communication link, synchronize data elements in the collaborative collection of data elements presented within the first Glass pane between electronic communication device and the communication endpoint, such that any update to the collaborative collection of data elements made at the communication endpoint is presented both within the first Glass pane of the display and at the communication endpoint and any update to the collaborative collection of data elements made at the electronic communication device is presented both within the first Glass pane of the display and at the communication endpoint; and at conclusion of the real-time communication link, store in data storage, in association with the party associated with the communication endpoint, a state of the first Glass pane.

8. The electronic communication device of claim 7, wherein the real-time communication link includes a voice communication link.

9. The electronic communication device of claim 7, wherein the processor core synchronizes the data elements by pushing the update to at least one of the electronic communication device and a network-connected third party platform.

10. The electronic communication device of claim 7, wherein the processor core is configured to control editing of the data elements presented within the first Glass pane through application of one or more role-based rules.

11. The electronic communication device of claim 10, wherein:

the user associated with the electronic communication device is a contributor of a data element among the collaborative collection of data elements presented within the first Glass pane;

the party associated with the communication endpoint is a subscriber of the data element; and the processor core is configured to control editing by permitting removal of the data element from the first Glass pane only in response to receipt of authorization from the subscriber.

12. The electronic communication device of claim 10, wherein the processor core is configured to control editing by persisting a data element among the collaborative collection of data elements presented within the first Glass pane in response to receipt of an approval of a persistence request.

13. A program product, comprising:

a computer-readable storage device; and program code stored within the computer-readable storage device, wherein the program code, when executed by a processor core of an electronic communication device, causes the electronic communication device to perform:

detecting initiation of a real-time communication link between the electronic communication device and a communication endpoint via a communication network;

in response to the detecting, the electronic communication device automatically presenting, within a display associated with the electronic communication device during a duration of the real-time communication link, a communication portal including at least:

a first Glass pane containing a collaborative collection of data elements shared between and updatable by both a user of the electronic communication device and a party associated with the communication endpoint;

a second Glass pane in which a private data collection of the user is presented, wherein the private data collection is uniquely associated with the party associated with the communication endpoint;

presenting within the display in association with the first Glass pane a messaging pane in which a chronological thread of text messages between the electronic communication device and the communication endpoint is presented;

during the duration of the real-time communication link, the electronic communication device synchronizing the data elements in the collaborative collection of data elements presented within the first Glass pane between the electronic communication device and the communication endpoint, such that any update to the collaborative collection of data elements made at the communication endpoint is presented both within the first Glass pane of the display and at the communication endpoint and any update to the collaborative collection of data elements made at the electronic communication device is presented both within the first Glass pane of the display and at the communication endpoint; and at conclusion of the real-time communication link, the electronic communication device storing in data storage, in association with the party associated with the communication endpoint, a state of the first Glass pane.

14. The program product of claim 13, wherein the real-time communication link includes a voice communication link.

15. The program product of claim 13, wherein the synchronizing includes pushing the update to at least one of the electronic communication device and a network-connected third party platform.

16. The program product of claim 13, wherein the program code further causes the electronic communication device to perform:
controlling editing of the data elements presented within the first Glass pane through application of one or more role-based rules.

17. The program product of claim 16, wherein:
the user associated with the electronic communication device is a contributor of a data element among the collaborative collection of data elements presented within the first Glass pane;
the party associated with the communication endpoint is a subscriber of the data element; and
said controlling editing includes:
the electronic communication device permitting removal of the data element from the first Glass pane only in response to receipt of authorization from the subscriber.

18. The program product of claim 16, wherein controlling editing includes persisting a data element among the collaborative collection of data elements presented within the first Glass pane in response to receipt of an approval of a persistence request.

* * * * *